(12) United States Patent
Albertin et al.

(10) Patent No.: US 11,171,877 B2
(45) Date of Patent: Nov. 9, 2021

(54) COMPUTER NETWORK OF COMPUTING RESOURCE INFRASTRUCTURES AND METHOD FOR ALLOCATING THESE RESOURCES TO CLIENT APPLICATIONS

(71) Applicant: BULL SAS, Les Clayes sous Bois (FR)

(72) Inventors: Loic Albertin, Meylan (FR); Benoît Pelletier, Saint Etienne de Crossey (FR)

(73) Assignee: BULL SAS, Les Clayes sous Bois (FR)

( * ) Notice: Subject to any disclaimer, the term of this patent is extended or adjusted under 35 U.S.C. 154(b) by 199 days.

(21) Appl. No.: 16/474,595

(22) PCT Filed: Dec. 28, 2017

(86) PCT No.: PCT/FR2017/053864
§ 371 (c)(1),
(2) Date: Jun. 28, 2019

(87) PCT Pub. No.: WO2018/122540
PCT Pub. Date: Jul. 5, 2018

(65) Prior Publication Data
US 2021/0136003 A1   May 6, 2021

(30) Foreign Application Priority Data
Dec. 29, 2016   (FR) .................... 16 63536

(51) Int. Cl.
*H04L 12/911* (2013.01)
*H04L 12/927* (2013.01)
*H04L 29/08* (2006.01)

(52) U.S. Cl.
CPC .......... *H04L 47/783* (2013.01); *H04L 47/803* (2013.01); *H04L 47/806* (2013.01); *H04L 67/125* (2013.01)

(58) Field of Classification Search
CPC ... H04L 47/783; H04L 47/806; H04L 47/803; H04L 67/125
See application file for complete search history.

(56) References Cited

U.S. PATENT DOCUMENTS 10,341,181 B2 *  7/2019  Bortnikov ............. G06F 16/184
10,521,311 B1 * 12/2019  Greenwood ........ G06F 11/2028
(Continued)

FOREIGN PATENT DOCUMENTS

WO    WO 2011/075150    6/2011

OTHER PUBLICATIONS

International Search Report, PCT/FR2017/053864, dated Mar. 19, 2018.
(Continued)

*Primary Examiner* — Michael Won
(74) *Attorney, Agent, or Firm* — Meagher Emanuel Laks Goldberg & Liao, LLP

(57) ABSTRACT

Disclosed is a computer network including a group of a plurality of computing resource infrastructures associated with a plurality of orchestrators responsible for allocating the resources of this infrastructure to one or more client applications and grouped into a swarm in which they are interconnected by a cooperation interface, the allocation of resources being decided by a decision method based firstly on evaluations distributed among the orchestrators, then on a consensus protocol between the orchestrators which is based on the evaluations and is carried out at the cooperation interface in order to choose one of the infrastructures of the group to host some or all of the client application.

19 Claims, 11 Drawing Sheets

(56) References Cited

U.S. PATENT DOCUMENTS

| | | | | |
|---|---|---|---|---|
| 10,846,788 | B1* | 11/2020 | Klein | H04L 47/25 |
| 2007/0180119 | A1* | 8/2007 | Khivesara | H04L 47/828 |
| | | | | 709/226 |
| 2011/0016214 | A1* | 1/2011 | Jackson | G06F 9/505 |
| | | | | 709/226 |
| 2012/0260232 | A1* | 10/2012 | Hirsch | G06F 8/36 |
| | | | | 717/107 |
| 2013/0304903 | A1* | 11/2013 | Mick | H04L 67/10 |
| | | | | 709/224 |
| 2015/0237128 | A1* | 8/2015 | Castro | H04L 67/1095 |
| | | | | 709/203 |
| 2015/0263987 | A1* | 9/2015 | Klein | H04L 47/00 |
| | | | | 709/226 |
| 2015/0356000 | A1* | 12/2015 | Giammaria | H04L 63/1441 |
| | | | | 717/127 |
| 2018/0019948 | A1* | 1/2018 | Patwardhan | H04L 47/2475 |
| 2018/0183855 | A1* | 6/2018 | Sabella | H04L 47/803 |
| 2019/0104182 | A1* | 4/2019 | Elzur | H04L 41/5025 |
| 2020/0310394 | A1* | 10/2020 | Wouhaybi | H04L 41/0846 |
| 2021/0014301 | A1* | 1/2021 | Doshi | H04L 67/10 |

OTHER PUBLICATIONS

Alexandru-Florian Antonescu et al: "Dynamic Topology Orchestration for Distributed Cloud-Based Applications", Network Cloud Computing and Applications (NCCA), 2012 Second Symposium On, IEEE, Dec. 3, 2012 (Dec. 3, 2012), pp. 116-123, XP032339559, DOI: 10.1109/NCCA.2012.14 ISBN: 978-1-4673-5581-0 paragraph [II.background.and.related.work].

Zhao Xingyu et al: "Computational and communication resource allocation for mobile cooperative cloudlet computing systems", 2015 International Conference on Wireless Communications & Signal Processing (WCSP), IEEE, Oct. 15, 2015 (Oct. 15, 2015). pp. 1-5, XP032820560, 001: 10.1109/WCSP.2015.7341155 paragraph [I.introduction].

* cited by examiner

COMPUTER NETWORK OF COMPUTING RESOURCE INFRASTRUCTURES AND METHOD FOR ALLOCATING THESE RESOURCES TO CLIENT APPLICATIONS

FIELD OF THE INVENTION

The invention relates to the field of computer networks comprising a group of a plurality of computing resource infrastructures, as well as to the field of methods for deciding on the allocation of computing resources of any of the computing resource infrastructures of a same group of infrastructures in a computer network, to some or all of a client application for the purposes of hosting it.

BACKGROUND OF THE INVENTION

For its execution, a software application may depend on other basic software components, for example Java runtime support or an Oracle database, as well as on infrastructure services and resources, for example a block level storage device, a load balancing system, an Ethernet network, central processing units (CPUs), storage memories.

A software application, also called a client application, may be distributed and divided either across a same infrastructure comprising different computing resources of a data center managed by a same resource manager, or across different infrastructures composed of heterogeneous hardware architectures at multiple locations. For example, one module of an application may run on a traditional data center infrastructure, while another module may run on an HPC supercomputer.

The deployment and provisioning of a distributed software application can be described in a complex process known as "workflows". Similarly, the autonomous management of this distributed software application, including error recovery, load adaptation, and application updating, can be described in workflows.

Orchestrator-type software aims to automate the progress of these processes of autonomous provisioning or management of applications. It manages the interconnections between modules of an application that is distributed across several resources of a same infrastructure or across several resources belonging to different infrastructures.

Application management processes are explicitly described either generically in the orchestrator or as metadata associated with the application.

In a hybrid infrastructure that includes a plurality of orchestrators, one orchestrator per infrastructure, application deployment includes steps of selecting the target orchestrator or target infrastructure before interacting with the orchestrator chosen. The selection process may be human-driven or automated by a system of rules. The steps of selecting the target orchestrator or the target infrastructure may take place in different types of systems.

In the following, the terms system and network will be used interchangeably unless otherwise stated.

According to a first prior art, a centralized system for deploying client applications on infrastructures of a same group in a computer network is known. The computer network may include one or more such groups of computing resource infrastructures. The central node of this centralized system has the disadvantage of being both a bottleneck to the speed of deployment of client applications as well as a single point of failure. Indeed, as all communications relating to the deployment of client applications pass through this central node, traffic will quickly become saturated here and a failure here prevents all client applications from deploying to all infrastructures. In addition, extensibility of the system requires reconfiguring the rules of this central node. Examples of this first centralized prior art are "Apache Brooklyn" (registered trademark), or "Indigo" (registered trademark).

According to a second prior art, a decentralized system for deploying client applications on infrastructures of a same group in a computer network is known. The computer network may include one or more such groups of computing resource infrastructures. A decentralized system is the connection of a plurality of centralized subsystems that are linked to each other. The central node of each centralized subsystem has the disadvantage of being both a bottleneck to the speed of deployment of client applications as well as a single point of failure. Indeed, as all communications relating to the deployment of client applications being carried out at this centralized subsystem pass through this central node, traffic will quickly become saturated here and a failure here prevents all client applications from deploying to all infrastructures of this centralized subsystem, therefore prevents the deployment of a portion of the client applications to a portion of the infrastructures of this decentralized system.

According to a third prior art, there is a known system which first distributes fixed activities in a predetermined manner to different computing resource infrastructures. Next, mobile activities are attached to the fixed activities on the basis of a placement algorithm running in parallel on each infrastructure without sharing the allocation result. As a consequence, the fixed activities are not optimally allocated according to the structure or status of the infrastructures, and the same mobile activity may be unnecessarily duplicated on several infrastructures or, even more serious, not hosted on any infrastructure.

SUMMARY OF THE INVENTION

The aim of the present invention is to provide a computer network and a method for deciding on the allocation of computing resources of the infrastructures of a same group in this computer network, which at least partially overcomes the above disadvantages.

The invention proposes placing and distributing client applications on different infrastructures, by entire client application or only by application component, according to a distributed but synchronized intelligence.

In effect, the invention proposes using a distributed computer network to avoid bottleneck(s) and single point(s) of failure, while synchronizing and harmonizing the resource allocation decision so that it is unified and coherent, in particular thus preventing a client application from being hosted in duplicate on two infrastructures or not being hosted on any infrastructure.

More particularly, the invention aims to provide a computer network of computing resource infrastructures and a method for deciding on the allocation of these resources, such that the evaluations are distributed to the respective orchestrators of these infrastructures in order to avoid both bottleneck(s) and single point(s) of failure, and such that the orchestrators are grouped into a swarm and interconnected by a cooperation interface on which a consensus protocol decides on the allocation of resources based on these evaluations, in order to ensure both the uniqueness and the consistency of the resource allocation that has been decided.

For this purpose, the present invention proposes a computer network comprising a group of a plurality of computing resource infrastructures wherein: each infrastructure comprises a plurality of computing resources that are distinct from each other but managed by a same resource manager; each infrastructure is associated with an orchestrator responsible for allocating the resources of this infrastructure to one or more client applications; said orchestrators are grouped into a swarm in which said orchestrators are interconnected by a cooperation interface, the allocation of resources of any of the group's infrastructures to a client application in order to host some or all of this client application is decided by a decision method based on: firstly, evaluations of the ability to satisfy the requirements of this client application, respectively distributed among the orchestrators of this swarm, then a consensus protocol between the orchestrators of the swarm, which is based on said evaluations, is carried out at the cooperation interface, and chooses one of the infrastructures of the group to host some or all of the client application.

For this purpose, the present invention also proposes a method for deciding on the allocation of the computing resources of any of the computing resource infrastructures of a same group of infrastructures in a computer network, to some or all of a client application for the purposes of hosting it, based firstly on evaluations, distributed among the respective orchestrators of said infrastructures, of their ability to satisfy the requirements of said client application, then a consensus protocol between said orchestrators, which: is based on said evaluations, is carried out at a cooperation interface interconnecting said orchestrators of a same swarm associated with said group of infrastructures, and chooses one of said infrastructures of said group to host some or all of said client application, allocating some or all of the resources of the chosen infrastructure to it.

According to preferred embodiments of the invention, the deployment of client applications in a network of computing resource infrastructures is carried out by an intelligent swarm of orchestrators. Each orchestrator separately evaluates a scenario for hosting each client application, and for each client application the best hosting scenario is chosen by consensus between the orchestrators of the swarm. Next, the client applications are deployed in parallel to their respective infrastructures. This deployment is thus both faster and more robust in case of local failures within the network.

According to preferred embodiments of the invention, the decision is distributed and there is no central point and therefore no single point of failure. In addition, the decision method is automated and does not require human intervention. The consensus protocol used ensures a high level of robustness and allows building a coherent group with a reliable status shared between the different orchestrators. In addition, with no single point of failure and no bottleneck, the system allows better scalability. Lastly, the system allows adding new orchestrator instances dynamically, their available resources becoming automatically and immediately available, as well as aggregating heterogeneous resources for the deployment of an application.

According to preferred embodiments of the invention, extensibility of the system is facilitated, to the extent that a new orchestrator supporting a new type of infrastructure only needs to communicate its capabilities to its peers on its cooperation interface in order to be integrated into the swarm of orchestrators. In addition, responsibility is distributed, which improves autonomy. Each orchestrator can even embed its own suitability score calculation logic, with the specific characteristics of the type of infrastructure supported and its execution context, for example the location or the level of saturation. In addition, there are different possible communication channels for the operator of a client application, one channel per orchestrator. It also allows the use of the entire bandwidth in terms of processing capacity due to aggregating the capacities of each orchestrator. Finally, it is more resistant to failure, has better performance due to the distributed calculations, and even allows heterogeneity in the technology of the various infrastructures composing the network or system.

According to preferred embodiments, the invention comprises one or more of the following features which can be used separately or in partial or complete combinations, with the abovementioned objects of the invention.

Preferably, said decision method comprises the following successive steps: a first step of requesting the deployment of some or all of a client application to one of the orchestrators of the swarm; a second step of broadcasting the requirements of some or all of said client application to all orchestrators of the swarm, over their cooperation interface; a third step of notifying, over their cooperation interface, whether or not the orchestrators of the swarm are participating in the evaluations; a fourth step in which each of the orchestrators participating in the evaluations performs the evaluation by calculating a score for some or all of said client application; a fifth step of agreeing, via the consensus protocol, on the choice of which infrastructure of the group achieved the highest score for hosting some or all of said client application; a sixth step of deploying some or all of said application to the chosen infrastructure.

Thus, the evaluations and the information used for these evaluations are distributed, while the results of these evaluations are synchronized and harmonized so that the final decision on allocating the resources of a chosen infrastructure to a requesting client application is both unified and optimized in terms of a match between the requesting application and the chosen resource infrastructure.

Preferably, the entire client application is evaluated at one time and is assigned to a single infrastructure.

The evaluation is thus simpler and faster.

Preferably, each component of the client application is evaluated separately and is assigned to a single infrastructure, it being possible to assign two separate components of a same client application to two respective different infrastructures of the group, one component of the client application being a unit of deployment in the deployment of this application on one of the group's infrastructures, one component preferably being a physical machine or a virtual machine or a container.

The evaluation is thus more optimized in terms of the match between the requesting application and the chosen resource infrastructure, since it is not only optimized client application by client application, but also client application component by client application component.

Preferably, said deployment step comprises the following phases: a first phase of launching a plurality of deployments of a plurality of separate components of a same client application, in parallel on a plurality of different infrastructures selected in a same group; a second phase of synchronizing said deployments with each other during said deployments; a third phase of updating the relationships between the various components of this same client application which are hosted on the various infrastructures of this same group; a fourth phase in which an operator of the client application requests a report on the deployments from one of the orchestrators of the swarm; a fifth phase in which this orchestrator accesses the status of the deployments, by means of the cooperation interface; a sixth phase in which this orchestrator sends the status report on the deployments, to the operator of the client application.

Thus, the deployment of a plurality of client applications, or even many client applications, in a same computer network is both fast and efficient.

Preferably, a plurality, preferably all, of the infrastructures of a same group able to host the various components of a same client application are heterogeneous with each other.

The optimization of the deployment of the different components of a same client application is thus even more attractive in terms of the match between the requesting application and the chosen resource infrastructure, because some components of a same client application have very different requirements, which would reduce their operational efficiency if they were to be deployed on one and the same type of computing resource infrastructure.

Preferably, said score calculation for a component of a client application also integrates the score of the other components of the same client application, in order to give preference to placing the various components of a same client application on the same infrastructure.

Thus, when the components of a same client application do not have requirements that vary greatly from one another, in order to improve the speed and the frequency of communication between these different components during the operation of their client application, co-placement is still given preference, in other words the placing of the different components of a same client application in a same resource infrastructure, particularly if the score calculations for the different infrastructures give results that are close or more or less equivalent to each other.

Preferably, each orchestrator of a same group embeds its own score calculation logic for performing an evaluation, integrating both the specific characteristics of the type of associated infrastructure and the context for its use.

Thus, each orchestrator is autonomous as well as optimized for performing each of its evaluations for each client application that needs hosting.

Preferably, an operator of the client application can contact any of the orchestrators of the swarm in order to request hosting for some or all of said application.

Regardless of which orchestrator is contacted, the operator of the client application is thus guaranteed to have a resource allocation decision that is both independent of the orchestrator contacted and optimized for its client application requirements.

Preferably, after an orchestrator receives a request to host a client application, this orchestrator broadcasts some or all of the metadata of this client application to the other orchestrators of the swarm, for their respective evaluations.

Thus, all orchestrators of a same swarm that want to participate in evaluating the requirements of a requesting client application can do so, because they quickly and simply receive all the information they need to perform their own evaluation of these requirements of the requesting client application.

Preferably, in order to evaluate its ability to satisfy the requirements of a client application, each orchestrator of the swarm opens a session of predetermined duration, possibly renewable before the session ends, the end of all sessions of the orchestrators of the swarm triggering said consensus protocol.

Thus, when an orchestrator either itself decides to abandon an evaluation in progress or is forced to abandon an evaluation in progress for another cause, for example because of orchestrator failure or a lost connection with the other orchestrators, this faulty orchestrator does not negatively impact the other orchestrators which have successfully completed their evaluations in time and would otherwise have to wait for the faulty orchestrator, possibly for a very long time or even indefinitely.

Preferably, each orchestrator of the swarm has its own mode for evaluating its ability to satisfy the requirements of a client application, this evaluation mode being modifiable at each orchestrator of the swarm by connecting an evaluation logic module.

Thus, a computer network administrator remains free and able to manually change the evaluation modes of any such orchestrator of the swarm, if necessary.

Preferably, an orchestrator may decide to abandon an evaluation in progress for a client application, if that client application has a particular profile that is unsuitable for that orchestrator's infrastructure.

The orchestrator thus saves itself some time and avoids contaminating or slowing other orchestrators better suited for hosting a given client application.

Preferably, an operator of the client application uses a client interface of the orchestrator to discover the type of resources supported by the infrastructure associated with the orchestrator and to request deployment of an application to the orchestrator.

The operator of the client application can thus pre-select the orchestrator which seems most suitable, so that if it is indeed the one chosen by the consensus protocol within the swarm, the deployment of this client application to the infrastructure of the orchestrator provisionally pre-selected by the operator and ultimately chosen by the consensus protocol, is more immediate.

Preferably, each orchestrator of the swarm refuses to participate in evaluations if its resources are too limited or if it has been configured to deny new deployments of applications.

This orchestrator thus saves itself some time and avoids contaminating or slowing other orchestrators better suited for hosting a given client application.

Preferably, a new orchestrator communicates its types of resource and its capabilities, on its cooperation interface, to the other orchestrators of a swarm in order to be integrated into their swarm.

The rest of the swarm can thus choose to accept or reject this new orchestrator, depending on its specific requirements at the swarm level and its associated strategy.

Preferably, the client applications describe their requirements to the orchestrator they contact, in a TOSCA model. This model is particularly simple and effective for describing the requirements of a client application in a way that subsequently facilitates their evaluation by the different orchestrators of a same swarm.

Preferably, at least one, preferably a plurality, more preferably all, of the orchestrators of the swarm each include a communication module for communicating with the other orchestrators of the swarm on the cooperation interface, a client interface module for communicating with the operators of the client applications, a score calculation module for calculating the score for the client application whose requirements are communicated to it, a deployment module for deploying a client application on the infrastructure associated with said orchestrator, the client interface, score calculation, and deployment modules of an application all communicating with the communication module.

This orchestrator structure thus optimizes the distribution of tasks within the same orchestrator, enabling the orchestrator to efficiently perform its evaluation as well as to share it quickly and easily with the other orchestrators of the swarm.

Other features and advantages of the invention will be apparent from reading the following description of a preferred embodiment of the invention, given by way of example and with reference to the accompanying drawings.

DETAILED DESCRIPTION OF THE INVENTION

Figure 1:
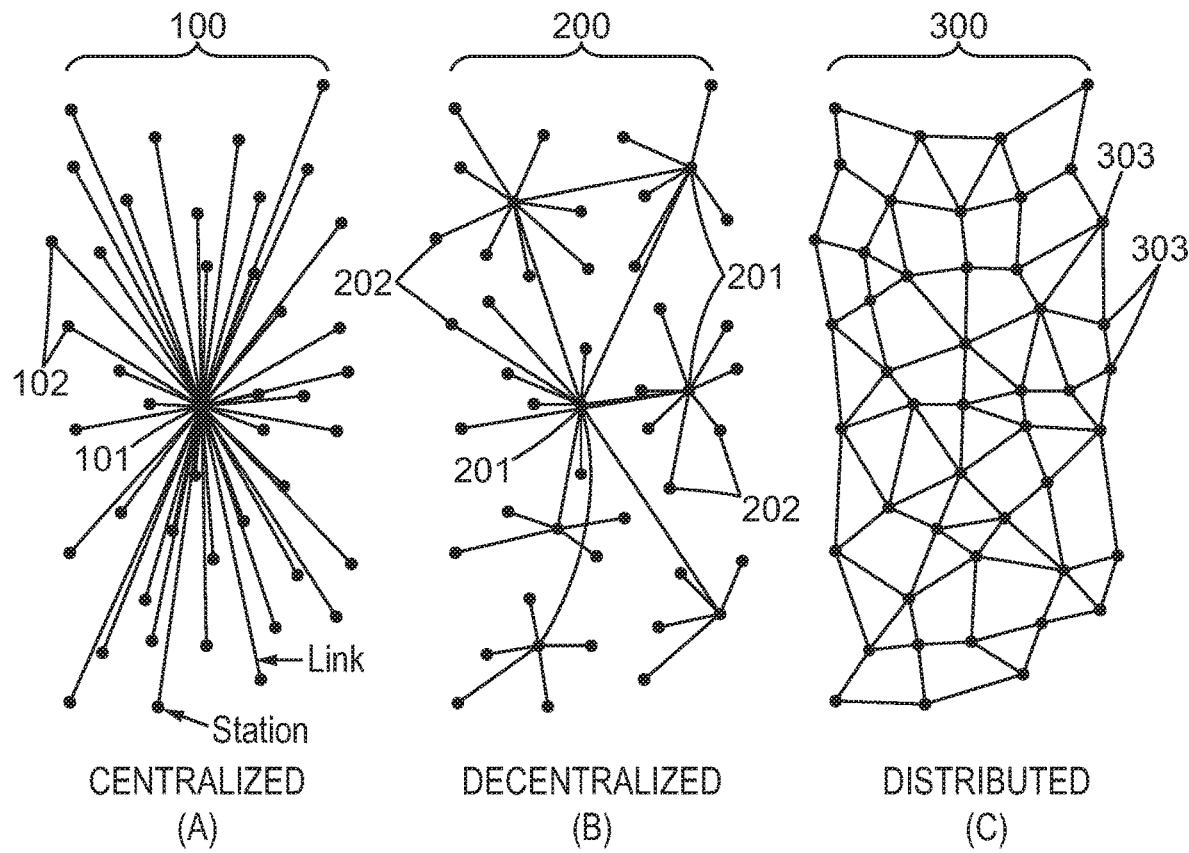
FIG. 1 schematically represents a comparative example of computer network architectures.

FIG. 1 schematically represents a comparative example of computer network architectures.

A centralized first type of computer network 100, corresponding to the first prior art, comprises a central node 101 to which all secondary nodes 102 are directly connected. All communications between two secondary nodes 102 pass through the central node 101. The central node 101 is therefore both a bottleneck to the transmission of messages and a single point of failure because if it fails, none of the secondary nodes 102 can continue to communicate with the other secondary nodes 102.

A decentralized second type of computer network 200, corresponding to the second prior art, comprises several interconnected central nodes 201 to which groups of secondary nodes 202 are respectively and directly connected. All communications between two secondary nodes 202 of a same group pass through the central node 201 of that group. All communications between two secondary nodes 202 of two different groups pass through several central nodes 201, and possibly may take several different paths passing through different central nodes 201. The central nodes 201 are therefore bottlenecks to the transmission of messages, although less so than the centralized computer network 100 because for the decentralized computer network 200 only a portion of the communications passes through each of the central nodes 201, and are single points of failure, although less critical than for the centralized computer network 100 because for the decentralized computer network 200 only a portion of the communications passes through each of the central nodes 201.

A third type of distributed computer network 300, which is the type of the invention, comprises only simple nodes 303 with a fairly dense network of interconnections enabling all communications between two simple nodes 303 to be able to circulate via numerous paths, so that no simple node 303 can become a bottleneck to the transmission of messages or a single point of failure if it fails. The distributed computer network 300 is more robust and more fluid than the centralized 100 and decentralized 200 computer networks.

Figure 2:
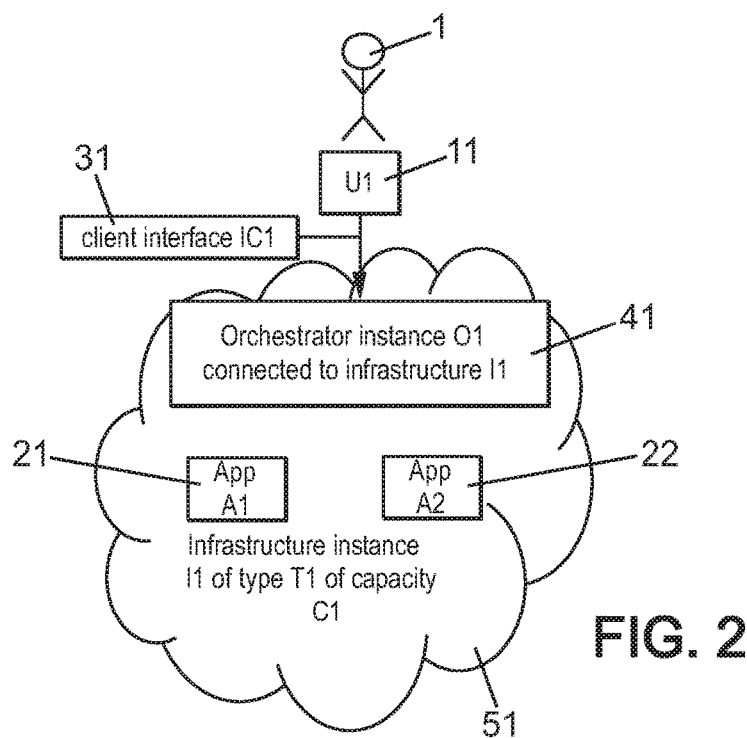
FIG. 2 schematically represents an exemplary association between orchestrator and infrastructure in a computer network, according to one embodiment of the invention.

FIG. 2 schematically represents an exemplary association between orchestrator and infrastructure in a computer network, according to one embodiment of the invention.

An operator 1 manages a client application from a user workstation 11 and communicates through a client interface 31 with an orchestrator 41 managing a computing resource infrastructure 51, more specifically with an orchestrator instance 41 connected to its resource infrastructure 51. The goal of the operator 1 is to obtain hosting for the client application on the infrastructure 51, in particular hosting for components 21 and 22 of the client application, in other words to have resources of the infrastructure 51 allocated to components 21 and 22 of the client application.

The orchestrator 41 is an autonomous element capable of managing the deployment of a client application on its infrastructure 51. The orchestrator 41 is represented with its underlying infrastructure 51 that is connected to it and showing a client application deployed on this infrastructure 51. The orchestrator 41 supports the provisioning of infrastructure resources of a certain type T1 in order for the hosted client application to function. The capacity limit C1 depends on the limits of the connected infrastructure 51. A user workstation 11 of the system uses a client interface 31 to discover the types of resources supported by the interface 51 and to submit a client application deployment to this orchestrator 41.

Figure 3:
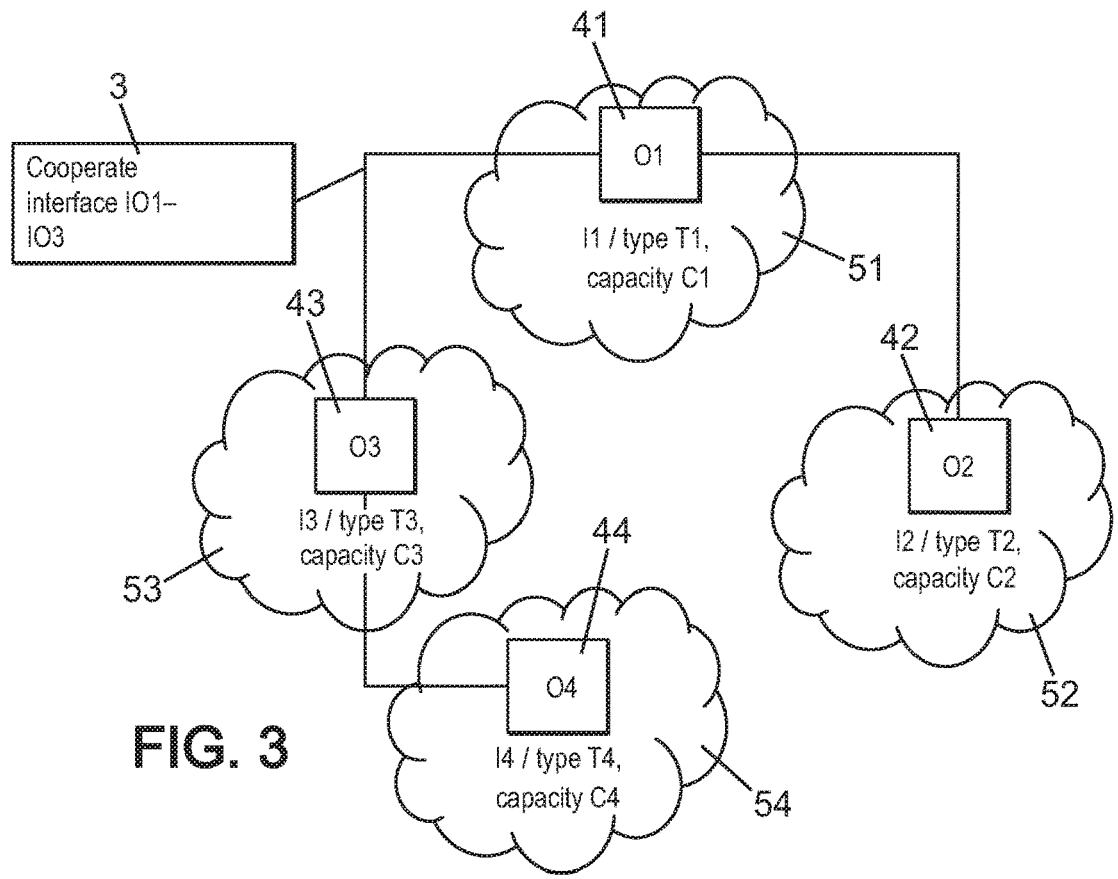
FIG. 3 schematically represents an exemplary swarm of orchestrators in a computer network, according to one embodiment of the invention.

FIG. 3 schematically represents an exemplary swarm of orchestrators in a computer network, according to one embodiment of the invention.

Four orchestrators 41, 42, 43 and 44, which form a swarm of orchestrators, respectively manage four infrastructures 51, 52, 53, and 54 that are associated with them. These four orchestrators 41 to 44 communicate with each other via a cooperation interface 3 and exchange with each other the information they require.

This swarm of orchestrators 41 to 44 is formed by connecting the instances of orchestrators 41 to 44. This makes it possible to extend the capacities of each of the orchestrators 41 to 44 with the capacities of the other orchestrators 41 to 44 directly or indirectly connected to them. For example, the user workstations of orchestrator 41 will be able to benefit from the resources of the underlying infrastructures 51 to 54 of orchestrators 42 to 44. The user workstations can send a request to any of the orchestrators 41 to 44 and thus benefit from the resources available in all infrastructures 51 to 54 associated with this swarm of orchestrators 41 to 44.

Figure 4:
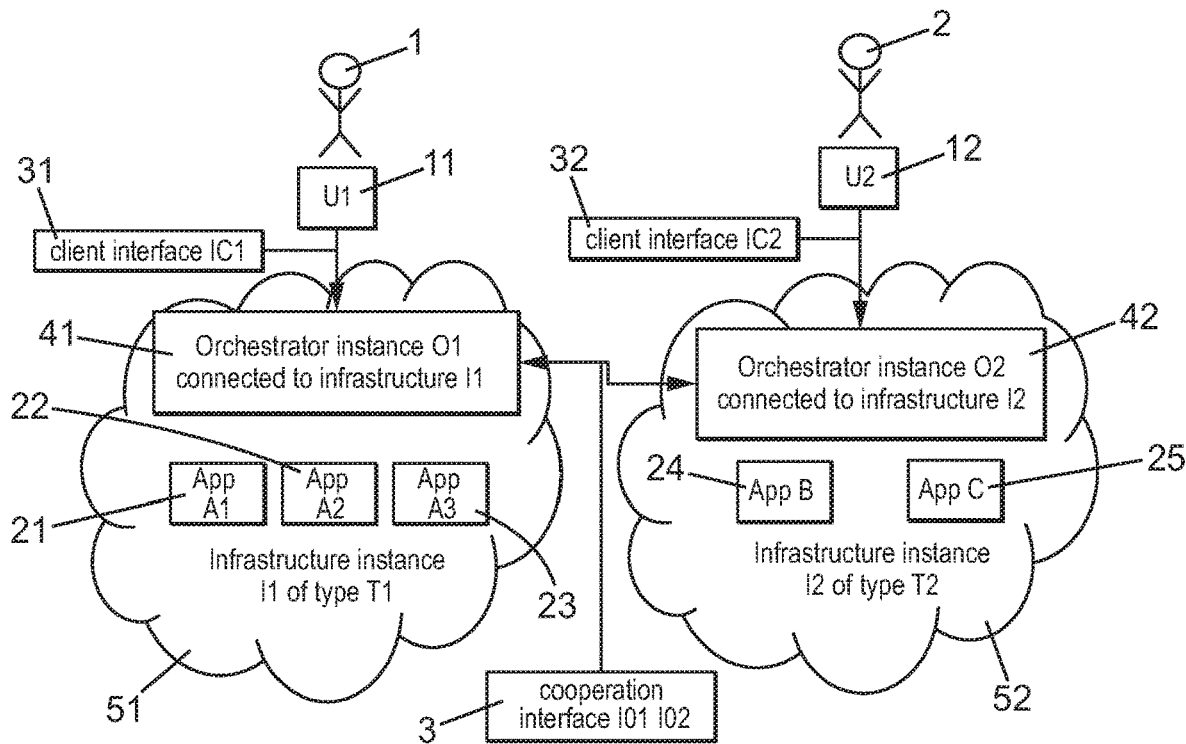
FIG. 4 schematically represents an exemplary deployment of client applications, each hosted on a same infrastructure in a computer network, according to one embodiment of the invention.

FIG. 4 schematically represents an exemplary deployment of client applications, each hosted on a same infrastructure in a computer network, according to one embodiment of the invention. Two different client applications can be hosted on two different infrastructures.

Orchestrators 41 and 42, respectively managing resource infrastructures 51 and 52, communicate with each other via the cooperation interface 3. The swarm formed by the two interconnected orchestrators 41 and 42 supports the deployment of different client applications to two infrastructures 51 and 52.

An operator 1 manages a plurality of client applications from a user workstation 11 and communicates via a client interface 31 with an orchestrator 41 managing an infrastructure 51 of computing resources. The goal of the operator 1 is to obtain hosting for the client applications on one or the other of the infrastructures 51 or 52, in particular hosting for components 21, 22, and 23 of a first client application as well as the only component 25 of a second client application, in other words resources of infrastructure 51 will be allocated to components 21 to 23 of the first client application, while resources of infrastructure 52 will be allocated to the single component 24 of the second client application.

An operator 2 manages a third client application from a user workstation 12 and communicates via a client interface 32 with an orchestrator 42 managing an infrastructure 52 of computing resources. The goal of the operator 2 is to obtain hosting for the client application on one or the other of infrastructures 51 or 52, in particular hosting for the single component 25 of the third client application, in other words resources of infrastructure 52 will be allocated to the single component 25 of the third client application.

Figure 5:
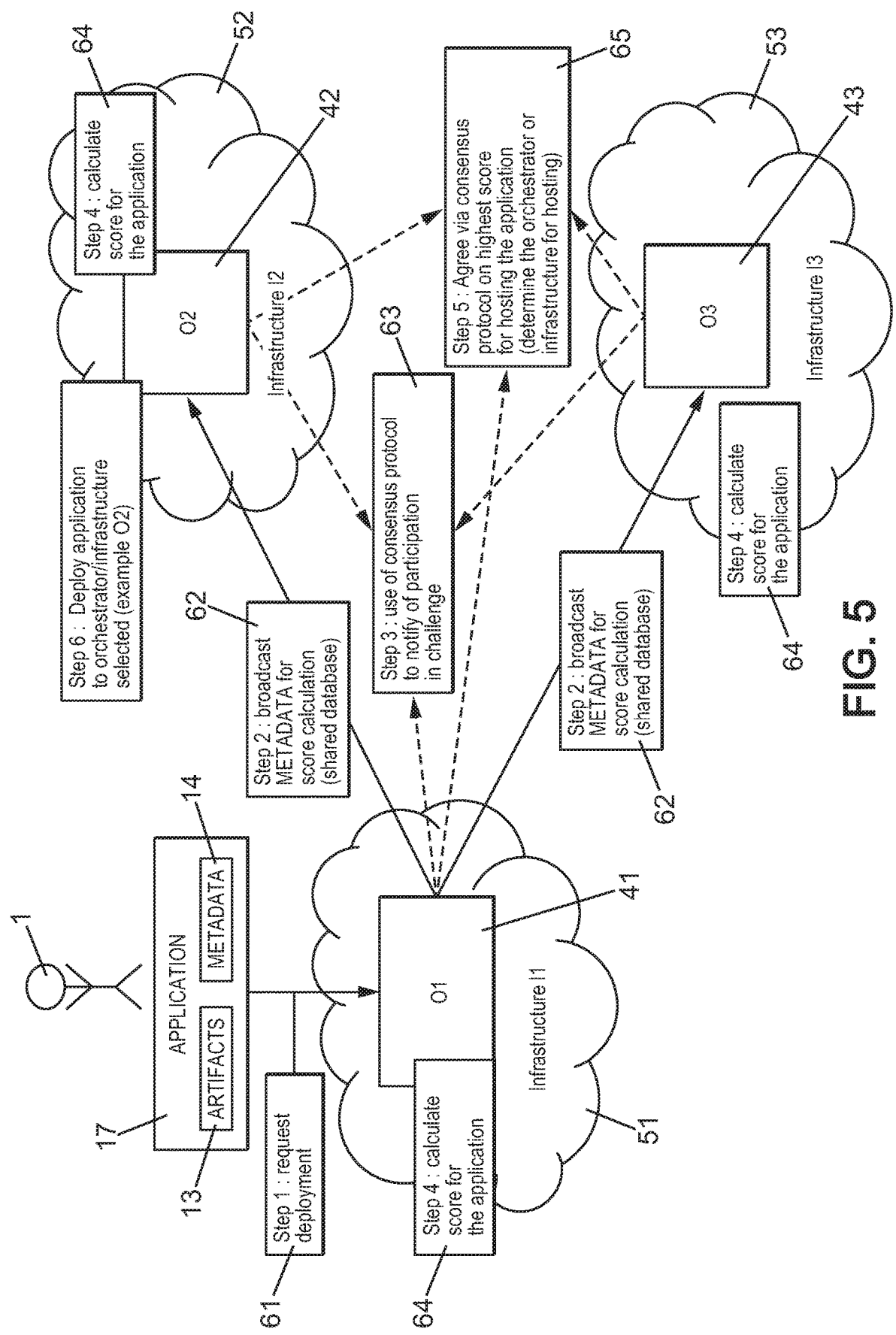
FIG. 5 schematically represents an example of the decision method for hosting client applications, each on a same infrastructure in a computer network, according to one embodiment of the invention.

FIG. 5 schematically represents an example of the decision method for hosting client applications, each on a same infrastructure in a computer network, according to one embodiment of the invention.

Three orchestrators 41, 42, and 43, which form a swarm, respectively manage three infrastructures 51, 52, and 53 that are associated with them. These three orchestrators 41 to 44 communicate with each other for the resource allocation decision method by means of a cooperation interface, via a consensus protocol represented here by dashed arrows, except for the broadcasting of information concerning the requirements of the client application 17, represented here by solid arrows, which is also carried out by means of the cooperation interface.

An operator 1 manages a client application 17 and communicates with orchestrator 41. The goal of the operator 1 is to obtain hosting for the client application on any of the infrastructures 51 to 53. The client application 17 includes artifacts 13 and metadata 14. Artifacts 13 include configuration information, for example binary configuration files or an installation script, as well as other objects useful for deploying the client application 17 on the selected infrastructure. The metadata 14 include additional descriptions of the context of the client application 17, for example a description of the environment in which the client application 17 will be deployed, a description of the characteristics of the host machine that will host the client application 17, or a modeling of the deployment of the client application 17.

The decision method comprises the following successive steps. To begin with, a first step 61 in which the deployment of some or all of the client application 17 to the orchestrator 41 is requested. Then, a second step 62 in which the requirements of some or all of said client application 17 are broadcast to orchestrators 42 and 43, on their cooperation interface. Then, a third step 63 in which there is notification of whether or not orchestrators 41 to 43 will participate in the evaluation, on their cooperation interface. Next, a fourth step 64 in which the evaluation is performed by having each of the orchestrators 41 to 43 participating in the evaluations calculate a score for some or all of said client application 17. Then, a fifth step 65 in which it is agreed, via the consensus protocol, on the choice of which of the infrastructures 51 to 53 of the group has achieved the highest score for hosting some or all of said client application 17. Finally, a sixth step in which the deployment of some or all of said application 17 is carried out on the chosen infrastructure 51 or 52 or 53, this step being described below in more detail in relation to FIG. 9.

When a client application 17 is submitted to the orchestrator 41, a distributed decision method based on a consensus protocol determines the orchestrator instance 41 to 43 and therefore the corresponding infrastructure 51 to 53 that will manage all the components or modules of this client application 17. A client application component 17 is a unit of deployment in the deployment of this client application 17 in the selected infrastructure which is one of infrastructures 51 to 53. This component may be hosted by a physical machine, a virtual machine, or a container, which are simply called compute nodes.

The decision method takes the metadata 14 of the client application 17 as input, these metadata 14 providing:
    a description of the client application 17 and its structure in terms of nodes and relationships, comprising:
        information about the nodes:
            at the infrastructure level in terms of computation, storage, and network,
            and at the software level, information about the relationships:
- of the "Hosted on" type,
- of the "Connected to" type,
- a list of mandatory requirements as a whole or for each node, such as the type of machine, for example x86 with graphics processing unit, the type of operating system, for example Linux (registered trademark), the type of distribution system, for example Linux (registered trademark) or Windows (registered trademark),
- a list of optional requirements as a whole or for each node and relationship, such as location, for example in France, type of support, for example MPI ("Message Passing Interface").

Upon receiving these metadata 14, each orchestrator 41 to 43 decides whether to participate in the evaluation of its ability to satisfy the requirements of this client application 17, in order to determine the orchestrator instance to host the deployment of this client application 17. If the orchestrator, for example orchestrator 42, chooses to participate in the evaluation, then this orchestrator 42 opens a session with a limited life span which it will have to renew regularly in order to extend its life span, and this continues as long as it has not announced via the consensus protocol the results of its own evaluation which is therefore its contribution to the general evaluation carried out by the entire swarm of orchestrators 41 to 43. If orchestrator 42 fails during its calculation, its session will not be renewed and therefore its session will be invalidated at the end of its life span. The evaluation, by all orchestrators participating in the swarm, ends when all the sessions participating in this evaluation have finished. This makes it possible to define at what moment the evaluation of the final result can be determined.

For each participating orchestrator 41 to 43, its calculation of the score evaluating its capacities for managing and therefore hosting the client application 17 is done based on the metadata 14 of this client application 17, and also on the available capacity, at the time of the evaluation, of the infrastructure 51 to 53 associated with this orchestrator 41 to 43, as well as taking into account its normalized average hourly cost in order to be comparable with the scores calculated for the other evaluated characteristics.

The capacities of the underlying infrastructure 51 to 53 are in particular: the type of resources supported, in terms of computation as well as storage or network, its occupied level (if this infrastructure 51 to 53 is in more or less use), its health indicator (if this infrastructure 51 to 53 is prone to errors, and how often).

The calculation algorithm travels the TOSCA graph of the application, node by node, for example by following the logic represented in the following table 1:

TABLE 1

| Initial value | Calculation logic score = 0 |
|---|---|
| Support for a mandatory requirement, in other words matches the capacities of the underlying infrastructure | If mandatory requirement supported, then score + 100 Else score = 0 and exit |
| Support for an optional requirement, in other words matches the capacities of the underlying infrastructure | If optional requirement supported, then score + 100 |
| Compatibility with occupied level | If occupied level for this type of resource <70%, then score + 100, If occupied level >90%, then score − 100, Else score maintained |
| Compatibility with general health level | If last error occurred less than an hour ago, then score − 100, If last error occurred more than 24 hours ago, then score + 100 Else score maintained |
| Impact of infrastructure cost | score − 10 times the normalized cost |

This logic for calculating the score is customizable by a mechanism of connecting a score calculation customization software module. This score calculation logic can be customized separately for each orchestrator 41 to 43.

The orchestrators 41 to 43 decide which orchestrator will be in charge of deployment, for example orchestrator 43, according to a consensus protocol which allows selecting the highest score obtained. If two orchestrators have an identical score, one of the two orchestrators is chosen randomly.

Figure 6:
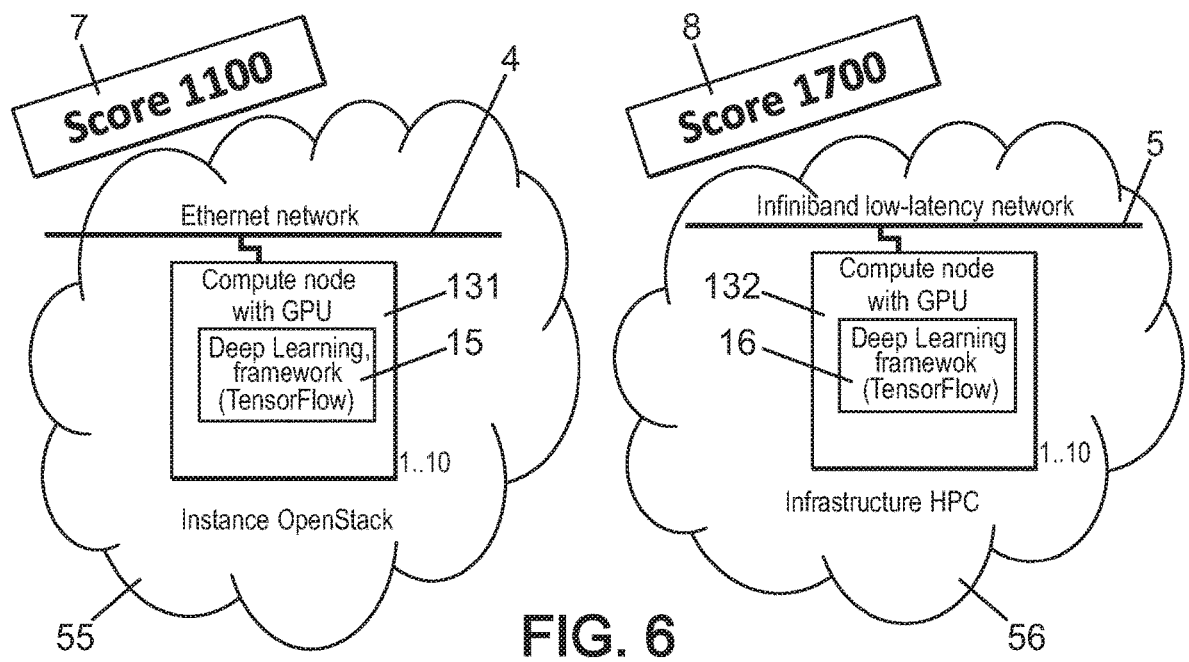
FIG. 6 schematically represents an exemplary result of a score calculation during the course of the decision method for hosting client applications, each on a same infrastructure in a computer network, according to one embodiment of the invention.

FIG. 6 schematically represents an exemplary result of a score calculation during the course of the decision method for hosting client applications, each on a same infrastructure in a computer network, according to one embodiment of the invention.

A first infrastructure 55 comprises an Ethernet network 4 which is connected to a compute node 131 with a graphics processing unit capable of hosting a client application by allocating resources 15 to it if its calculated score 7 is the best.

A second infrastructure 56 comprises a low-latency network such as "Infiniband" to which is connected a compute node 132 with a graphics processing unit capable of hosting this client application by allocating resources 16 to it if its calculated score 8 is the best.

An exemplary value of 1100 for score 7 being less than an exemplary value of 1700 for score 8, the consensus protocol will decide that the client application will be hosted on the second infrastructure 56 at node 132, allocating resources 16 to it.

For illustrative purposes, here is an example of metadata 14 for a deep learning type of client application 17. The mandatory requirements are, for example: 10 compute nodes of type x86, a Linux (registered trademark) type image, a network between the nodes. The optional requirements are, for example: all compute nodes are equipped with a graphics processing unit, all compute nodes are interconnected by a low-latency network. Deployment occurs on a swarm of orchestrators composed of two orchestrators (not shown in this figure for simplicity) and the two associated underlying infrastructures 55 and 56. Infrastructure 55 is of the OpenStack type and has an average cost normalized to 10, while infrastructure 56 is based on HPC technology and has an average cost normalized to 50. The saturation level of infrastructure 55 is less than 50%, while that of infrastructure 56 is 80%. There have not been any recent errors on either of the two infrastructures 55 and 56.

The scores computed by the two orchestrators for their two respective infrastructures 55 and 56 are described in Table 2 below:

TABLE 2

| Initial value | Infrastructure 55 score = 0 | Infrastructure 56 score = 0 |
|---|---|---|
| Support for mandatory requirements (10 nodes) | score + 10 × 100 = score + 1000 | score + 10 × 100 = score + 1000 |
| Support for an optional requirements, in other words matches the capacities of the underlying infrastructure | score + 0 (no graphics processing unit) | score + 10*100 (graphics processing unit) = score + 1000, then score + 100 (low-latency network) |
| Compatibility with occupied level | score + 100 | score + 0 |
| Compatibility with general health level | score + 100 | score + 100 |
| Impact of infrastructure cost | score − 10 × 10 = score − 100 | score − 10 × 50 = score − 500 |
| Total of scores | final score = 1100 | final score = 1700 |

The highest score is obtained by the orchestrator associated with infrastructure 56, so this is therefore the one that will manage the deep learning client application which will be hosted by infrastructure 56.

Figure 7:
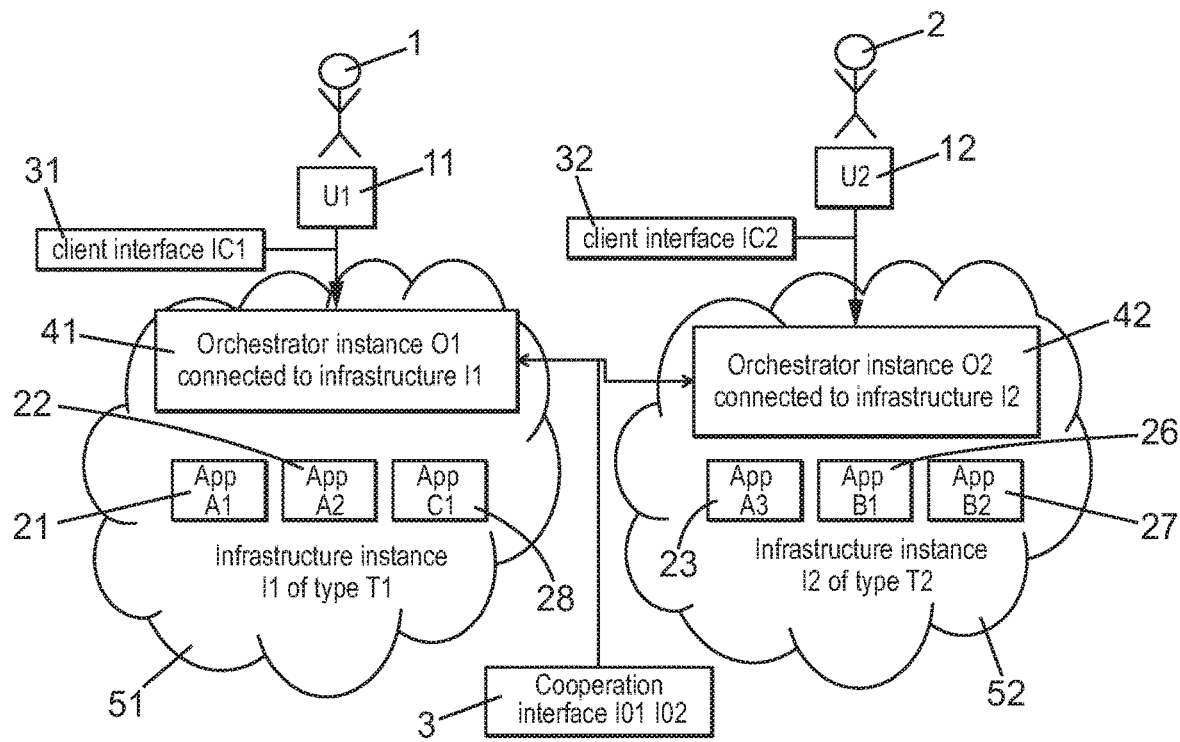
FIG. 7 schematically represents an exemplary deployment of client applications, each hosted on a plurality of different infrastructures in a computer network, according to one embodiment of the invention.

FIG. 7 schematically represents an exemplary deployment of client applications, each hosted on a plurality of different infrastructures in a computer network, according to one embodiment of the invention.

Orchestrators 41 and 42, respectively managing resource infrastructures 51 and 52, communicate with each other via the cooperation interface 3, this time not to distribute client applications between the different infrastructures 51 and 52 as a single unit, but to distribute these client applications between different infrastructures 51 and 52 component by component, some client applications possibly having their various components distributed between the two infrastructures 51 and 52.

The goal of the operators 1 and 2 is to obtain hosting for the various components of the client applications on one or the other of the infrastructures 51 or 52, in particular hosting for components 21, 22, and 23 of a first client application, components 26 and 27 of a second client application, as well as the only component 28 of a third client application, in other words here the resources of infrastructure 51 will be allocated to the first two components 21 and 22 of the first client application and to the single component 28 of the third client application, while the resources of infrastructure 52 will be allocated to the third component 23 of the first client application as well as to the two components 26 and 27 of the second client application.

The client application is called "hybrid" when it is managed by a plurality of orchestrators and hosted on a plurality of infrastructures, preferably of respective technologies that differ from each other.

Figure 8:
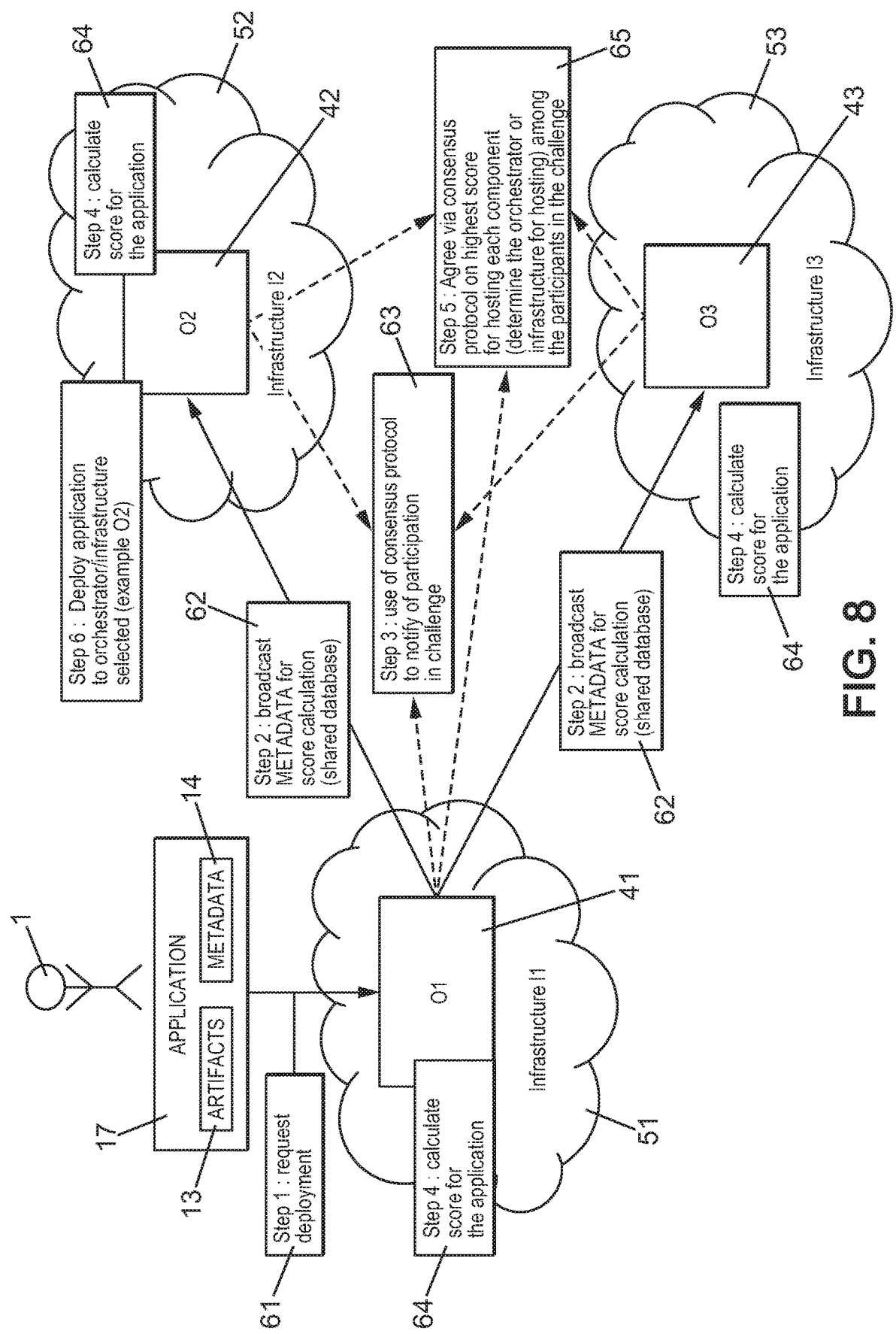
FIG. 8 schematically represents an example of a first part of the decision method for hosting client applications, each on a plurality of different infrastructures in a computer network, according to one embodiment of the invention.

FIG. 8 schematically represents an example of a first part of the decision method for hosting client applications, each on a plurality of different infrastructures in a computer network, according to one embodiment of the invention.

The decision method comprises the same successive steps as in FIG. 5, but these are carried out successively, in parallel for each client application component, and no longer only for each client application as a single unit.

When a client application 17 is submitted to the orchestrator 41, a distributed decision method based on a consensus protocol determines the instance or instances of orchestrators 41 to 43 and the associated infrastructures 51 to 53 that will manage each of the components of the client application 17.

The distributed decision method proceeds in the same manner as in FIG. 5, except that the score calculation of each orchestrator 41 to 43 is now done component by component for the client application 17, and no longer all at once for the entire client application 17 as in FIG. 5. In addition, for a given node on a given infrastructure, the score of neighboring nodes, in other words directly dependent on the given node, can be included in the computation of the score of the given node so as to give preference to co-placement of the various components of the client application 17, especially if the number of nodes and infrastructures is large.

Figure 9:
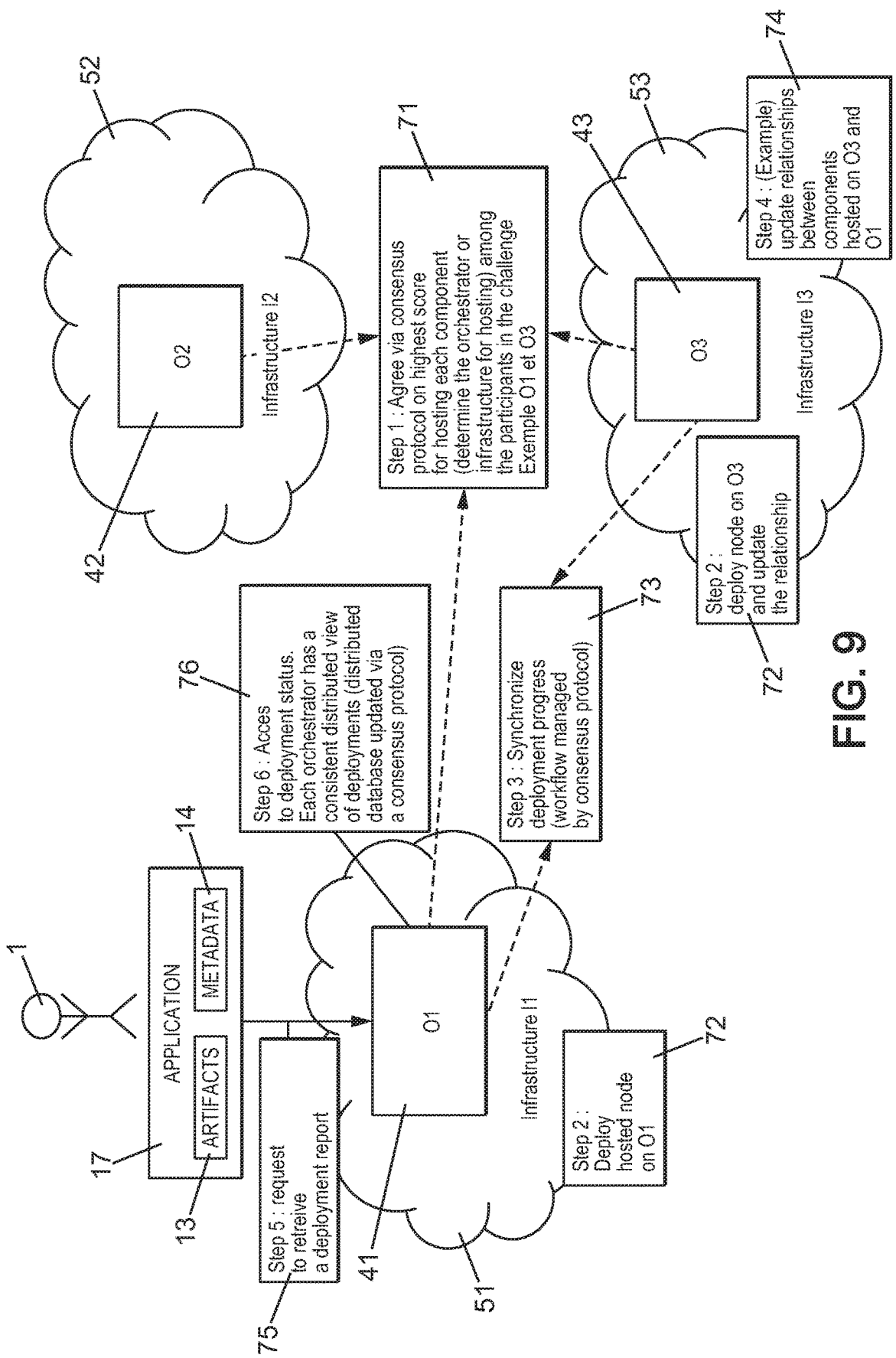
FIG. 9 schematically represents an example of a second part of the decision method for hosting client applications, each on a plurality of different infrastructures in a computer network, according to one embodiment of the invention.

FIG. 9 schematically represents an example of a second part of the decision method for hosting client applications, each on a plurality of different infrastructures in a computer network, according to one embodiment of the invention. FIG. 9 represents the different phases of the deployment step that is carried out after the other deployment steps performed in FIG. 8. The portion of the network represented in FIG. 9 is identical to the one represented in FIG. 8.

This deployment step comprises the following phases. To begin with, a first phase 71 of launching a plurality of deployments of a plurality of separate components of a same client application, in parallel on a plurality of different infrastructures 51 to 53 selected in a same group. Then, a second phase 72 of synchronizing said deployments with each other during said deployments. Then, a third phase 73 of updating the relationships between the various components of this same client application which are hosted on the various infrastructures 51 to 53 of this same group. Then, a fourth phase 74 in which the operator 1 of the client application requests a report on the deployments from orchestrator 41. Then, a fifth phase 75 in which that orchestrator 41 accesses the status of the deployments, by means of the cooperation interface (represented here by the dashed arrows). Finally, a sixth phase 76 in which this orchestrator 41 sends the status report on the deployments to the operator 1 of the client application. If several applications each having one or more components must be deployed, they can also all be deployed in parallel with each other.

For the deployment of a hybrid client application 17, orchestrators 41 to 43 proceed with the life cycle of the client application 17 in a distributed manner Technically, the life cycle of the application is described in a workflow and is among the metadata 14 of the client application 17. This workflow is composed of units which manage the life cycle of each component of the client application 17 independently of each other. The transitions in the workflow enable orchestrating the relationships between the various components of a same client application 17. The workflow is thus distributed across all the orchestrators 41 to 43 in charge of deploying the units of the workflow. Each orchestrator 41 to 43 is responsible for executing the steps of the components hosted by its respective infrastructure 51 to 53. The use of a consensus protocol makes it possible to synchronize the steps and therefore to trigger the transitions in the workflow at the desired moment, in other words only triggering a step B which requires prior completion of step A when step A is actually completed.

Figure 10:
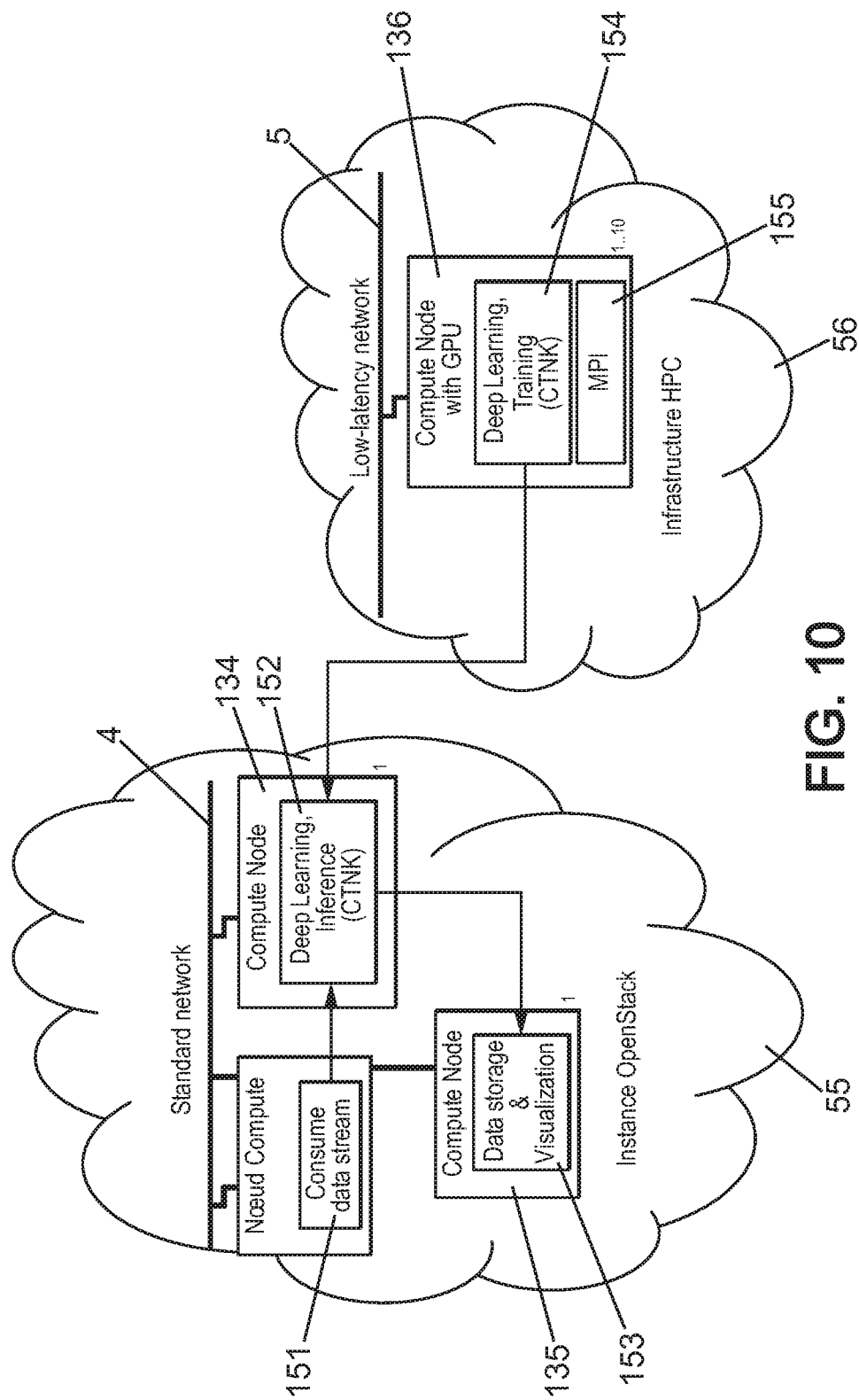
FIG. 10 schematically represents another exemplary deployment of client applications, each hosted on a plurality of different infrastructures in a computer network, according to one embodiment of the invention.

FIG. 10 schematically represents another exemplary deployment of client applications, each hosted on a plurality of different infrastructures in a computer network, according to one embodiment of the invention.

A first infrastructure 55 comprises an Ethernet network 4 to which are connected compute nodes 133, 134, and 135 capable of hosting components of a client application.

A second infrastructure 56 comprises a low-latency network 5 which is connected to a compute node 136 with a graphics processing unit capable of hosting other components of the client application.

The consensus protocol has decided that component 151 of the client application will be hosted on node 133 of the first infrastructure 55, that component 152 of the client application will be hosted on node 134 of the first infrastructure 55, that component 155 of the client application will be hosted on node 135 of the first infrastructure 55, and that components 154 and 155 of the client application will be hosted on node 136 of the second infrastructure 56.

Figure 11:
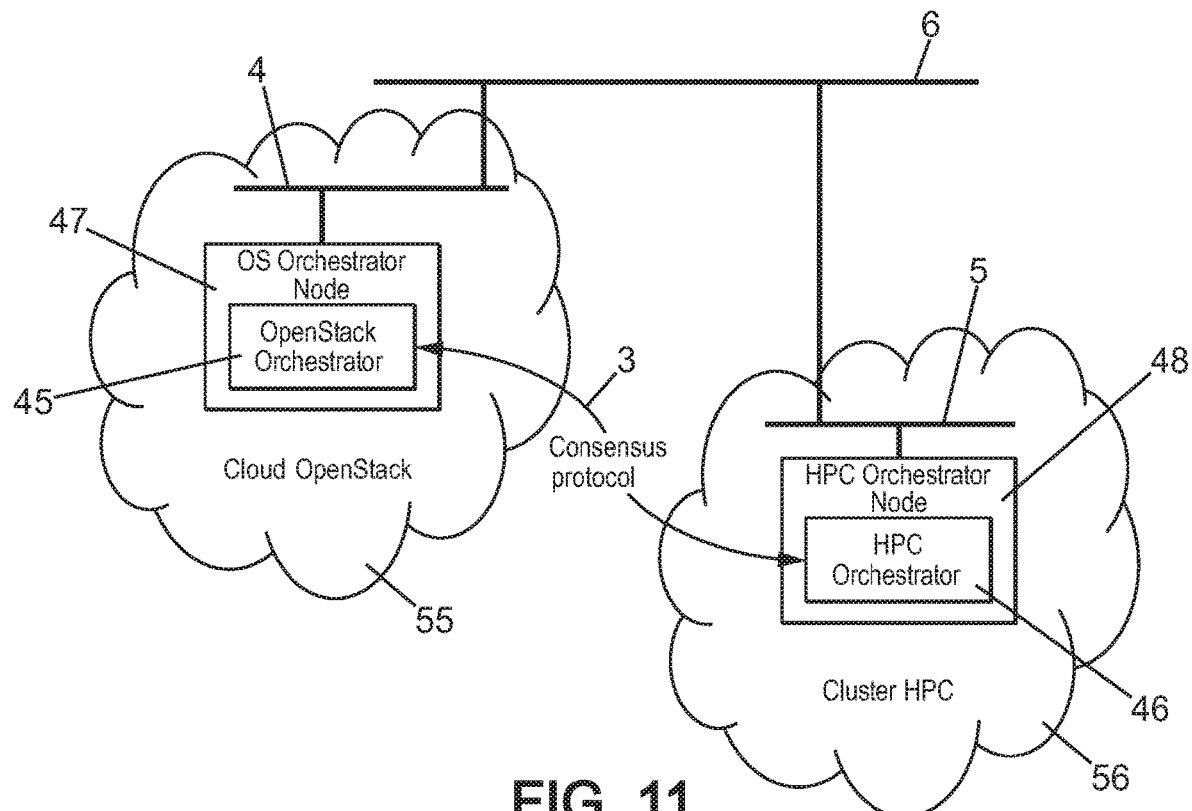
FIG. 11 schematically represents another exemplary swarm of orchestrators in a computer network, according to one embodiment of the invention.

FIG. 11 schematically represents another exemplary swarm of orchestrators in a computer network, according to one embodiment of the invention.

A first infrastructure 55, of the "OpenStack Cloud" type, comprises a network 4 to which is connected an orchestrator node 47 hosting an "OpenStack" type orchestrator 45.

A second infrastructure 56 of the "HPC Cluster" type (HPC for "High Performance Computing") comprises a network 5 to which is connected an orchestrator node 48 hosting an HPC type orchestrator 46.

The orchestrators 45 and 46, respectively managing resource infrastructures 55 and 56, communicate with each other via the cooperation interface 3 on which the consensus protocol takes place. These orchestrators 45 and 46 thus form a same swarm of orchestrators.

Here, the client application will be deployed as one unit on one infrastructure. The hosted client application will therefore be a "single-infrastructure application". The two respective instances of orchestrators 45 and 46 are interconnected by the consensus protocol. The network as a whole therefore supports two infrastructures 55 and 56 with different characteristics. On the one hand, infrastructure 56 offers high computing power and an internal communication network of very high speed and low latency, but does so at a high cost. Conversely, infrastructure 55 offers the possibility of creating many virtual machines at low cost, but with less computing power and a slower network.

In the case of a "big data" type of client application with several tiers and different characteristics. Indeed, a "deep learning" type of client application consumes a very large amount of data and applies mathematical models to these data which require a lot of memory and a low latency network for the exchange of these data.

Figure 12:
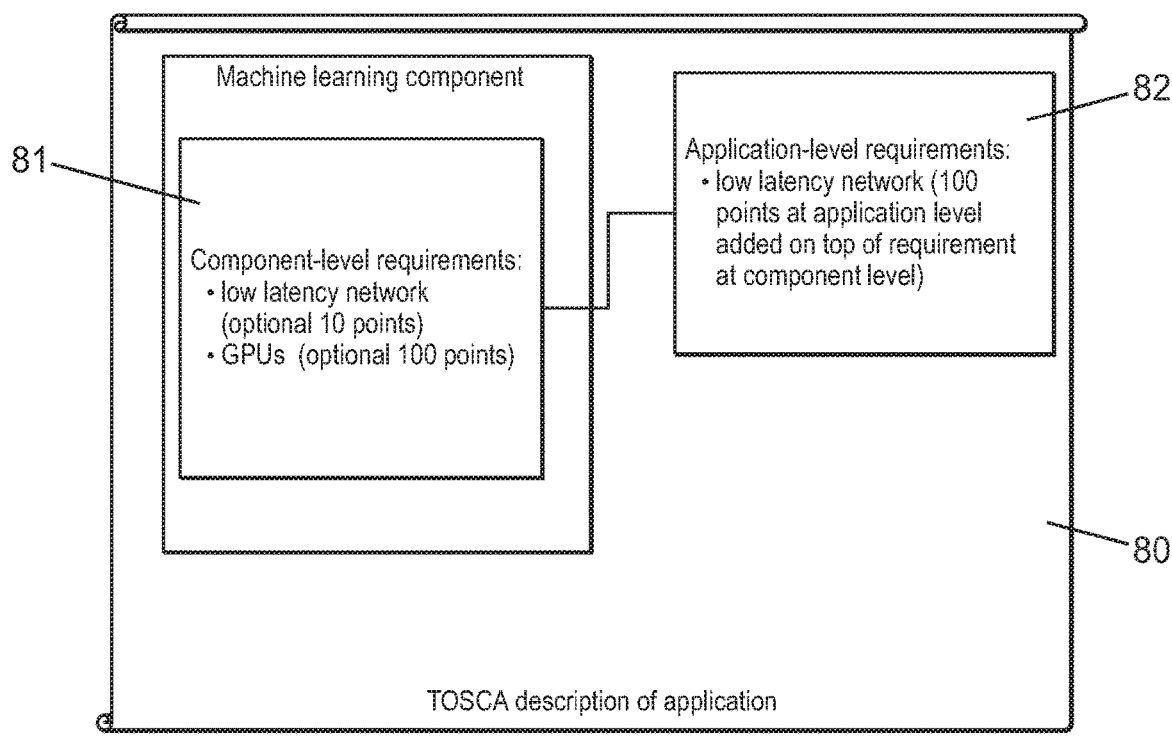
FIG. 12 schematically represents a description in the TOSCA language of the requirements of a client application to be hosted on a same infrastructure in a computer network, according to one embodiment of the invention.

FIG. 12 schematically represents a description in the TOSCA language (TOSCA for "Topology & Orchestration Specification for Cloud Application") of the requirements of a client application to be hosted on a same infrastructure in a computer network, according to one embodiment of the invention.

The client application is described in the TOSCA language. Each component has its life cycle implemented in this language. These components are assembled and their relationships established in the application. The characteristics of the components, such as their required computing power or their type of network, are also expressed in the TOSCA language at the component level and/or the application level, the application level being able to add on to the component level.

This description 80 comprises a description of the requirements at the component level and a description of the requirements at the application level.

The description 81 of requirements at the component level specifies a low latency network, which increases the score by 10 points, as well as the presence of a graphics processing unit, which increases the score by 100 points.

The description 82 of requirements at the application level again specifies a low latency network, which further increases the score by 10 points: this is an example of adding on in the application level for a requirement already specified at the component level.

Figure 13:
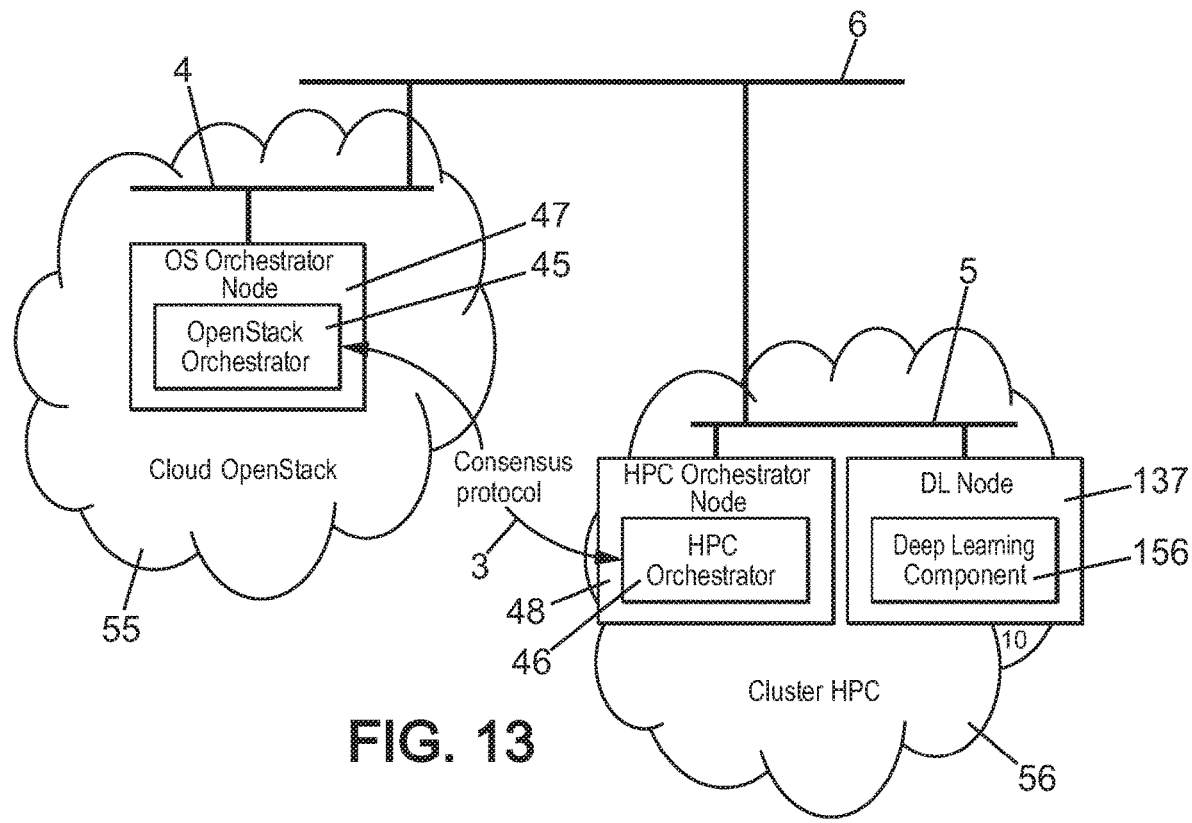
FIG. 13 schematically represents yet another exemplary deployment of client applications, each hosted on a same infrastructure in a computer network, according to one embodiment of the invention.

FIG. 13 schematically represents yet another exemplary deployment of client applications, each hosted on a same infrastructure in a computer network, according to one embodiment of the invention.

The first "OpenStack Cloud" type infrastructure 55 and its "OpenStack" type orchestrator 45, as well as the second "HPC Cluster" type infrastructure 56 and its "HPC" type orchestrator 46, are the same as in FIG. 11.

The orchestrators 45 and 46, respectively managing resource infrastructures 55 and 56, communicate with each other via the cooperation interface 3 on which the consensus protocol takes place. This consensus protocol has decided to host component 156 of the client application, for which the requirements were described in FIG. 12, in node 137 connected to the network 5 of the second infrastructure 56.

A request for deployment of the client application is then submitted to one of the instances of the swarm of orchestrators 45 and 46. For example, this is a request submitted to the instance of orchestrator 45. The instance of this orchestrator 45 acknowledges receipt of the request after storing the model of the client application in a database distributed between instances of the swarm of orchestrators, for subsequent announcement by the consensus protocol that a new evaluation for hosting this client application is open.

Each instance of orchestrator 45 or 46 wishing to participate in this evaluation opens a session of limited life span that it will have to renew regularly in order to extend its life span, and this continues as long as it has not announced via the consensus protocol the results of its own evaluation. If one of the orchestrators 45 or 46 fails during its calculation, its session is invalidated at the end of its life span. An orchestrator may also decide not to participate in an evaluation, in particular if its resources are limited or if an operator has configured it to refuse new deployments. The evaluation ends when all sessions participating in this evaluation have finished. Here, the two instances of orchestrators 45 and 46 are participating in the evaluation.

Each orchestrator instance 45 or 46 carries out the placement decision method as described in Table 2 in relation to FIG. 6, in order to ultimately announce, using the consensus protocol, the suitability scores for the client application. Using the consensus protocol allows selecting the orchestrator instance that is best suited for the deployment of the client application just evaluated. Here, infrastructure 56 is chosen. The selected orchestrator instance 46 then proceeds with the deployment life cycle for the client application components.

Figure 14:
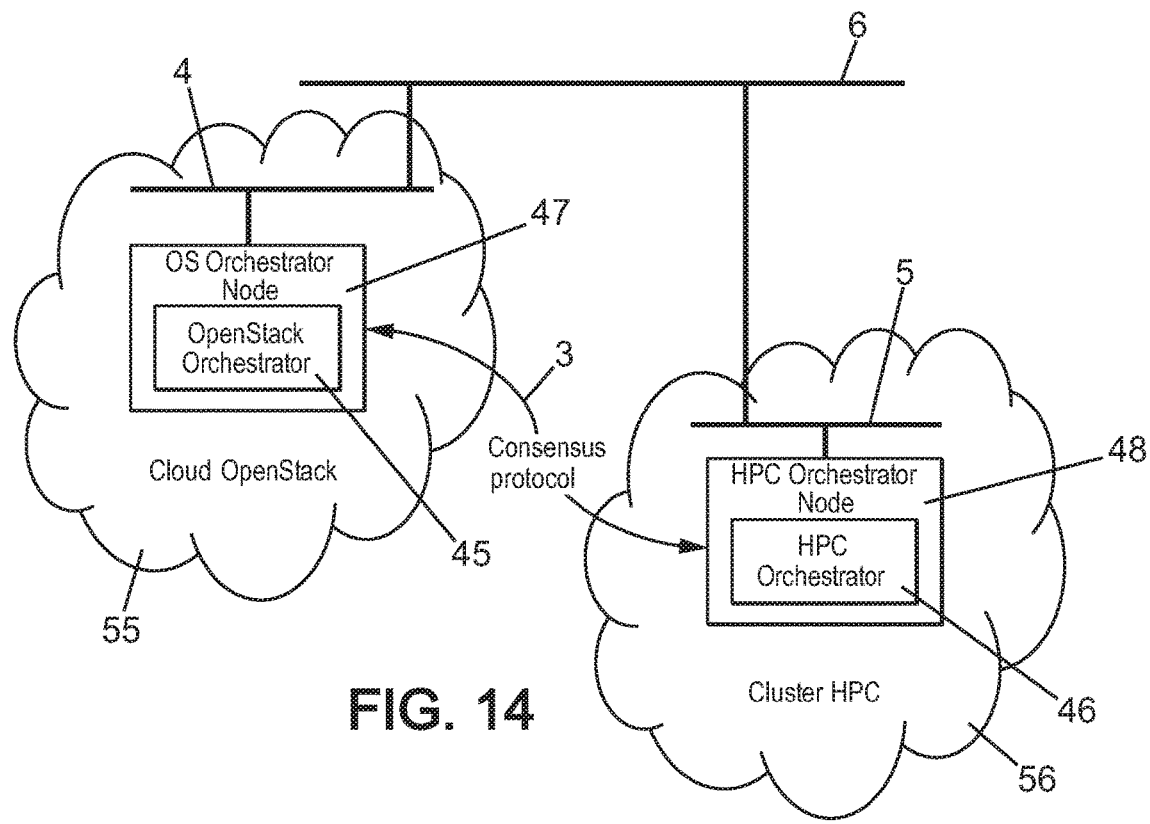
FIG. 14 schematically represents the same exemplary swarm of orchestrators as FIG. 11 in a computer network, according to one embodiment of the invention.

FIG. 14 schematically represents the same exemplary swarm of orchestrators as FIG. 11 in a computer network, according to one embodiment of the invention, but this time the consensus protocol will not be run only for each client application, but for each component of each client application, as different components of the same client application may be hosted by different infrastructures.

Here, the client application will be deployed on both infrastructures 55 and 56, component by component. The hosted client application will therefore be a "hybrid application". The two respective instances of orchestrators 45 and 46 are interconnected by the consensus protocol. The entire network therefore supports two infrastructures 55 and 56 with different characteristics. On the one hand, infrastructure 56 offers high computing power and an internal communication network with very high speed and low latency, but does so at a high cost of use. Conversely, infrastructure 55 offers the possibility of creating many virtual machines at low cost, but with less computing power and a slower network.

In the case of a "big data" type of client application with several tiers and different characteristics according to the different components of this client application. Indeed, a "deep learning" type of client application component consumes a very large amount of data and applies mathematical models to these data which require a lot of memory and a low latency network for the exchange of these data. On the other hand, once the model is applied to this large volume of data, the results, which are of much smaller volume, are stored in a database and a web-type human-machine interface is used to present these results. The "storage and presentation" component requires resilience, via redundancy and load distribution, but the required computing power is much lower than for the "deep learning" component.

Figure 15:
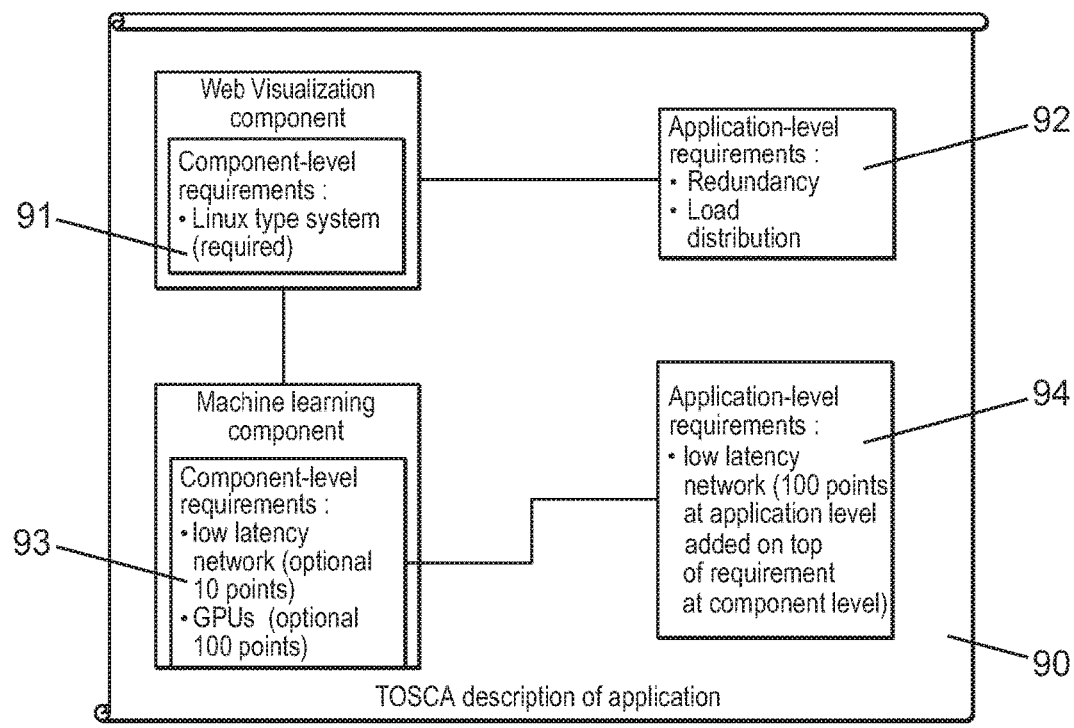
FIG. 15 schematically represents a description in the TOSCA language of the requirements of a client application to be hosted on a plurality of different infrastructures in a computer network, according to one embodiment of the invention.

FIG. 15 schematically represents a description in the TOSCA language of the requirements of a client application to be hosted on a plurality of different infrastructures in a computer network, according to one embodiment of the invention.

This description 90 comprises a description 91 of the requirements at the component level for a first component of a client application and a description 92 of the requirements at the client application level for this first component of this same client application, as well as a description 93 of the requirements at the component level for a second component of this same client application and a description 94 of the requirements at the client application level for this second component of this same client application.

The description 91 of the requirements at the component level for a first "storage and presentation" component of a client application specifies a Linux type system (registered trademark) as mandatory, without which the score falls and remains at 0 points.

The description 92 of the requirements at the client application level for this first "storage and presentation" component of this same client application specifies, as optional, redundancy which adds 10 additional points, and load distribution which also adds 10 additional points to the evaluation score.

The description 93 of the requirements at the component level for a second "deep learning" component of this same client application specifies a low-latency network, which increases the score by 10 points, as well as the presence of a graphics processing unit, which increases the score by 100 points.

The description 94 of the requirements at the application level for this second "deep learning" component of this same client application again specifies a low-latency network, which further increases the score by 10 points: this is again an example of adding on in the application level for a requirement already specified at the component level.

Figure 16:
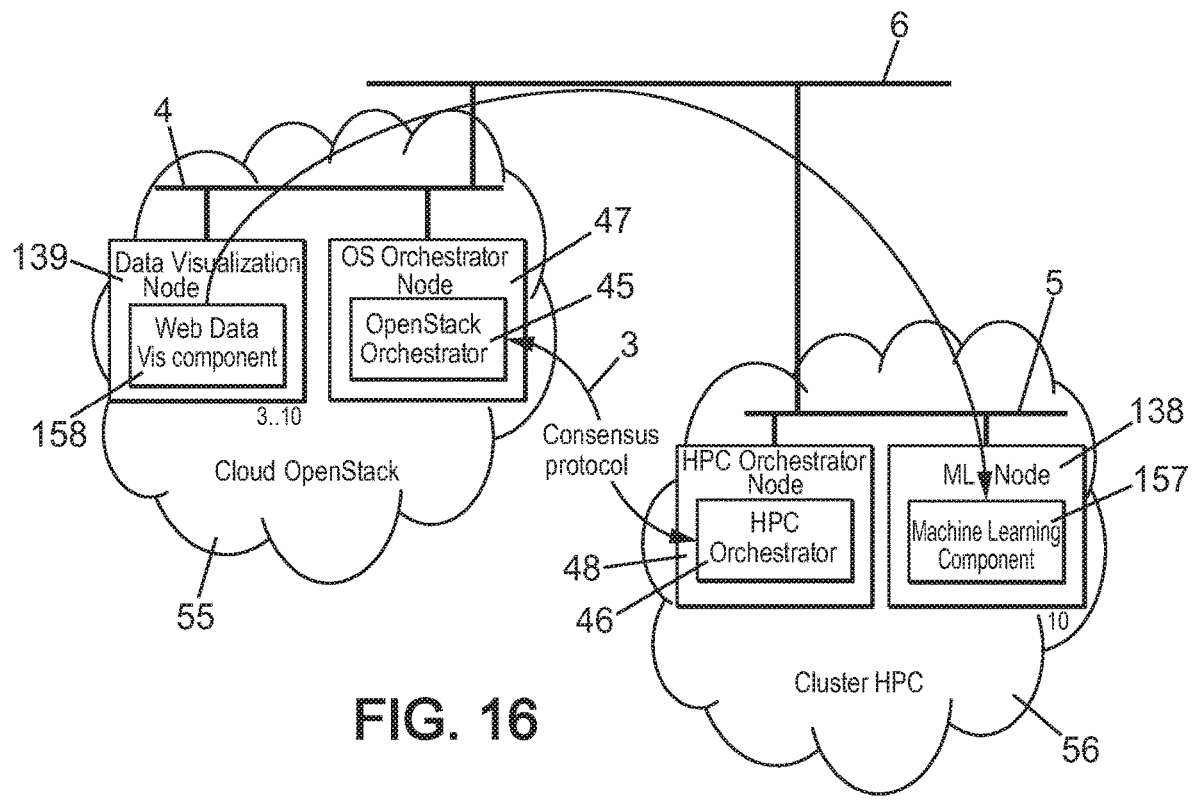
FIG. 16 schematically represents yet another exemplary deployment of client applications, each hosted on a plurality of different infrastructures, in a computer network according to one embodiment of the invention.

FIG. 16 schematically represents yet another exemplary deployment of client applications, each hosted on a plurality of different infrastructures in a computer network, according to one embodiment of the invention.

The first "OpenStack Cloud" type infrastructure 55 and its "OpenStack" type orchestrator 45, as well as the second "HPC Cluster" type infrastructure 56 and its "HPC" type orchestrator 46, are the same as in FIGS. 11, 13, and 14.

The orchestrators 45 and 46, respectively managing resource infrastructures 55 and 56, communicate with each other via the cooperation interface 3 on which the consensus protocol takes place. This consensus protocol has decided to host the first component 158 of the client application, for which the requirements were described in FIG. 15, in node 139 connected to the network 4 of the first infrastructure 55. In contrast, the consensus protocol has decided to host the second component 157 of the client application, for which the requirements were described in FIG. 15, in node 138 connected to the network 5 of the second infrastructure 56.

In the same manner as in FIG. 13, the two instances of orchestrators 45 and 46 participate in the evaluation opened for this new client application.

Each orchestrator instance 45 or 46 carries out the placement decision method as described in Table 2 in relation to FIG. 6, in order to ultimately announce, using the consensus protocol, the suitability scores for each component of the client application. Using the consensus protocol allows selecting the orchestrator instance that is best suited for the deployment of each of the components 157 and 158 of the client application that have just been evaluated. Here, infrastructure 56 is chosen for component 157, while infrastructure 55 is chosen for component 158. The orchestrator instance 46 selected for component 157 proceeds with the deployment life cycle for this component 157, while the orchestrator instance 45 selected for component 158 proceeds with the deployment life cycle for this component 158.

Each orchestrator instance 45 or 46 then carries out the deployment life cycle for the component 158 or 157 it was chosen to manage. The orchestrator instances 45 and 46 notify each other of their respective progress and use the consensus protocol to synchronize their progress with each other.

An example where synchronization is critical is the case of one module connecting to another. For example, a source module of the connection needs the target module to be in the "started" state before it enters its "configuration" state. The consensus protocol is again used here to notify of state changes and to trigger the required transitions at the appropriate time.

Figure 17:
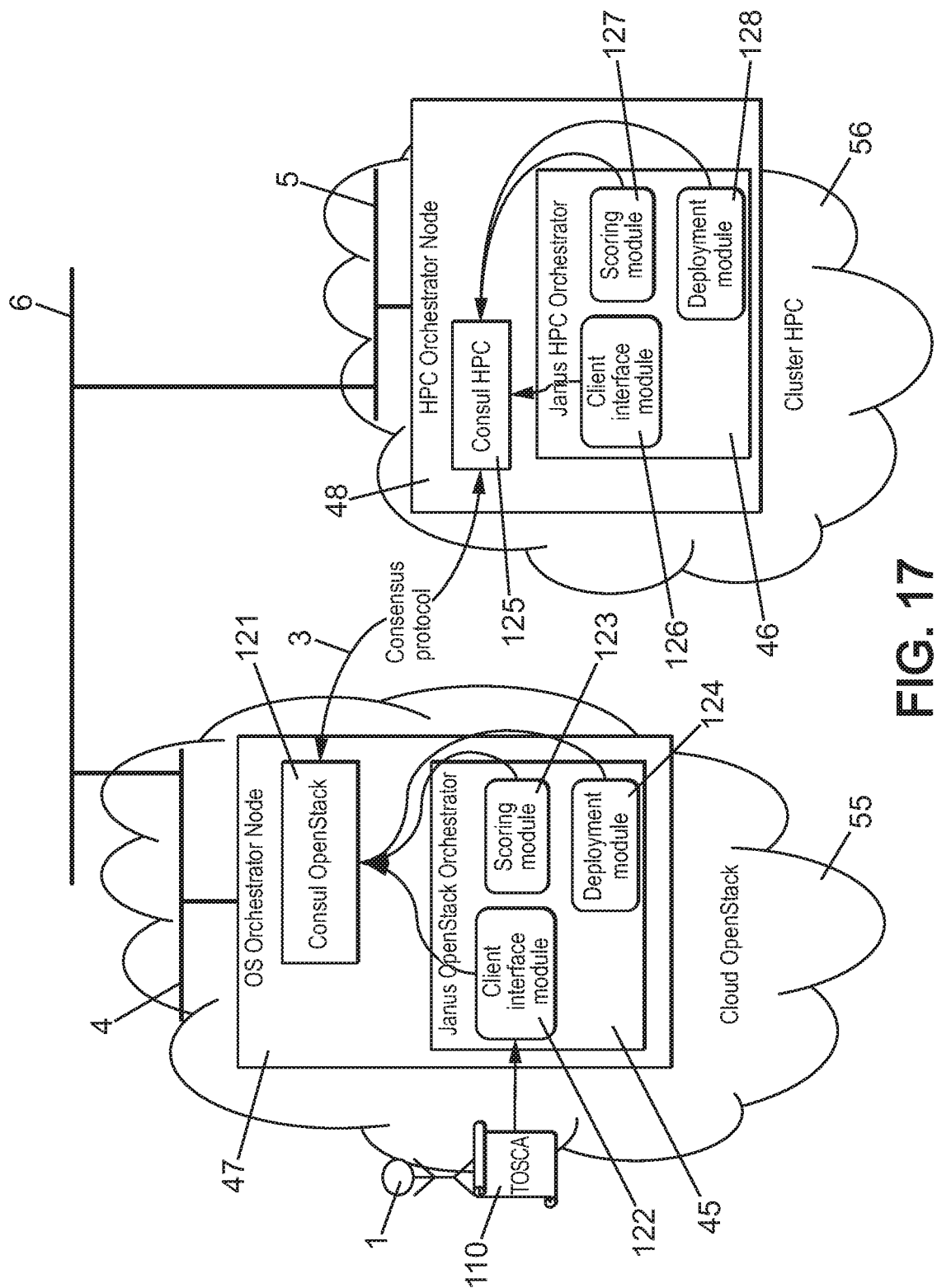
FIG. 17 schematically represents an exemplary structure of the orchestrators in the exemplary swarm of orchestrators of FIGS. 11 and 14 in a computer network, according to one embodiment of the invention.

FIG. 17 schematically represents an exemplary structure of the orchestrators in the exemplary swarm of orchestrators of FIGS. 11 and 14 in a computer network, according to one embodiment of the invention.

A first "OpenStack Cloud" type infrastructure 55 comprises a network 4 to which is connected an orchestrator node 47 hosting an "OpenStack" type orchestrator 45.

The orchestrator 45 comprises: a client interface module 122 responsible for retrieving from the operator 1 the description 110 in the TOSCA language of the client application; a score evaluation module 123 responsible for retrieving the metadata of the client application and returning the corresponding score, for the client application component concerned or for the client application concerned; a deployment module 124 for the client application or one of its components, responsible for reading the metadata of the application client and other deployment information for this client application. These three modules 122 to 124 communicate with each other and with outside the orchestrator 45 via an input/output module 121 of this orchestrator 45, located in node 47 and able to communicate with the other orchestrators of the swarm over the cooperation interface 3.

A second "HPC Cluster" (HPC for High Performance Computer) type infrastructure 56 comprises a network 5 to which is connected an orchestrator node 48 hosting an "HPC" type orchestrator 46.

The orchestrator 46 comprises: a client interface module 126 also responsible where appropriate for retrieving from an operator a description in the TOSCA language of the client application; a score evaluation module 127 responsible for retrieving the metadata of the client application and returning the corresponding score, for the client application component concerned or for the client application concerned; a deployment module 128 for the client application or one of its components, responsible for reading the metadata of the client application and other deployment information for this client application. These three modules 126 to 128 communicate with each other and with outside the orchestrator 46 via an input/output module 125 of this orchestrator 46, located in node 48 and able to communicate with the other orchestrators of the swarm over the cooperation interface 3.

The orchestrators 45 and 46 respectively managing the resource infrastructures 55 and 56 communicate with each other via the cooperation interface 3 on which the consensus protocol takes place.

Of course, the invention is not limited to the examples nor to the embodiment described and shown, but is suitable for numerous variants accessible to those skilled in the art.

The invention claimed is:

1. A computer network comprising a group of a plurality of computing resource infrastructures (51 to 56), wherein:
    each infrastructure (51 to 56) comprises a plurality of computing resources that are distinct from each other but managed by a same resource manager,
    each infrastructure (51 to 56) is associated with an orchestrator (41 to 46) responsible for allocating the resources of this infrastructure (51 to 56) to one or more client applications (17), at least 3 of said orchestrators (41 to 46) are grouped into a swarm in which:
        said at least 3 of said orchestrators (41 to 46) are interconnected by a cooperation interface (3),
        the allocation of resources of any of the group's infrastructures (51 to 56) to a client application (17) in order to host some or all of this client application (17) is decided by a decision method based on:
            firstly, evaluations of the ability to satisfy the requirements of this client application (17), respectively distributed among the orchestrators (41 to 46) of this swarm,
            next, a consensus protocol between said at least 3 orchestrators (41 to 46) of the swarm, which:
                is based on said evaluations,
                is carried out at the cooperation interface (3),
                chooses one of the infrastructures (51 to 56) of the group to host some or all of the client application (17),
    wherein said decision method comprises the following successive steps:
        a first step of requesting the deployment of some or all of a client application (17) to one of the orchestrators (41 to 46) of the swarm,
        a second step of broadcasting the requirements of some or all of said client application (17) to all orchestrators (41 to 46) of the swarm, over their cooperation interface (3),
        a third step of notifying, over their cooperation interface (3), whether or not the orchestrators (41 to 46) of the swarm are participating in the evaluations,
        a fourth step in which each of the orchestrators (41 to 46) participating in the evaluations performs the evaluation by calculating a score for some or all of said client application (17),
        a fifth step of agreeing, via the consensus protocol, on the choice of which infrastructure(s) (51 to 56) of the group achieved the highest score for hosting some or all of said client application (17),
        a sixth step of deploying some or all of said application (17) to the chosen infrastructure (51 to 56).

2. The computer network according to claim 1, wherein the entire client application (17) is evaluated at one time and is assigned to a single infrastructure (51 to 56).

3. The computer network according to claim 1, wherein each component (21 to 28) of the client application is evaluated separately and is assigned to a single infrastructure (51 to 56), it being possible to assign two separate components (21 to 28) of a same client application (17) to two different infrastructures (51 to 56) of the group, one component (21 to 28) of the client application (17) being a unit of deployment in the deployment of this application (17) on one of the group's infrastructures (51 to 56).

4. The computer network according to claim 3, wherein said deployment step comprises the following phases:
    a first phase of launching a plurality of deployments of a plurality of separate components (21 to 28) of a same client application (17), in parallel on a plurality of different infrastructures (51 to 56) selected in a same group,
    a second phase of synchronizing said deployments with each other during said deployments,
    a third phase of updating the relationships between the various components (21 to 28) of this same client application (17) which are hosted on the various infrastructures (51 to 56) of this same group,
    a fourth phase in which an operator (1, 2) of the client application (17) requests a report on the deployments from one of the orchestrators (41 to 46) of the swarm,
    a fifth phase in which this orchestrator (41 to 46) accesses the status of the deployments, via the cooperation interface (3),
    a sixth phase in which this orchestrator (41 to 46) sends the status report on the deployments, to the operator (1, 2) of the client application (17).

5. The computer network according to claim 4, wherein a plurality of said infrastructures (51 to 56) of a same group able to host the various components (21 to 28) of a same client application (17) are heterogeneous with each other.

6. The computer network according to claim 3,
    wherein said score calculation for a component (21 to 28) of a client application (17) also integrates the score of the other components (21 to 28) of the same client application (17), in order to give preference to placing the various components (21 to 28) of a same client application (17) on the same infrastructure (51 to 56).

7. The computer network according to claim 3,
    wherein each orchestrator (41 to 46) of a same group embeds its own score calculation logic for performing an evaluation, integrating both the specific characteristics of the type of associated infrastructure and the context for its use.

8. The computer network of claim 3, wherein one component is a physical machine or a virtual machine or a container.

9. The computer network according to claim 1, wherein an operator (1, 2) of the client application (17) contacts any of the orchestrators (41 to 46) of the swarm in order to request hosting for some or all of said application (17).

10. The computer network according to claim 1, wherein, after an orchestrator (41 to 46) receives a request to host a client application (17), this orchestrator (41 to 46) broadcasts some or all of the metadata (14) of this client application (17) to the other orchestrators (41 to 46) of the swarm, for their respective evaluations.

11. The computer network according to claim 1, wherein, in order to evaluate its ability to satisfy the requirements of a client application (17), each orchestrator (41 to 46) of the swarm opens a session of predetermined duration, possibly renewable before the session ends, the end of all sessions of the orchestrators of the swarm triggering said consensus protocol.

12. The computer network according to claim 1, wherein each orchestrator (41 to 46) of the swarm has its own mode for evaluating its ability to satisfy the requirements of a client application (17), this evaluation mode being modifiable at each orchestrator (41 to 46) of the swarm by connecting an evaluation logic module.

13. The computer network according to claim 1, wherein an orchestrator (41 to 46) may decide to abandon an evaluation in progress for a client application (17), if this client application (17) has a particular profile that is unsuitable for the infrastructure (51 to 56) of that orchestrator (41 to 46).

14. The computer network according to claim 1, wherein an operator (41 to 46) of the client application (17) uses a client interface (31, 32) of the orchestrator (41 to 46) to discover the type of resources supported by the infrastructure (51 to 56) associated with the orchestrator (41 to 46) and to request deployment of an application to the orchestrator (41 to 46).

15. The computer network according to claim 1, wherein each orchestrator (41 to 46) of the swarm refuses to participate in evaluations if its resources are too limited or if it has been configured to refuse new deployments of applications.

16. The computer network according to claim 1, wherein a new orchestrator (41 to 46) communicates its types of resources and its capabilities, on its cooperation interface (3), to the other orchestrators (41 to 46) of a swarm in order to be integrated into their swarm.

17. The computer network according to claim 1, wherein the client applications (17) describe their requirements to the orchestrator (41 to 46) they contact, in a TOSCA model.

18. The computer network according to claim 1, wherein at least one of the orchestrators (41 to 46) of the swarm each include:
a communication module (121, 125) for communicating with the other orchestrators (41 to 46) of the swarm on the cooperation interface (3),
a client interface module (122, 126) for communicating with the operators (1, 2) of the client applications (17),
a score calculation module (123, 127) for calculating the score for the client application (17) whose requirements are communicated to it,
a deployment module (124, 128) for deploying a client application (17) on the infrastructure (51 to 56) associated with said orchestrator (41 to 46),
the client interface (122, 126), score calculation (123, 127) and deployment (124, 128) modules of an application (17) all communicating with the communication module (121, 125).

19. A method for deciding on the allocation of the computing resources of any of the computing resource infrastructures (51 to 56) of a same group of infrastructures (51 to 56) in a computer network, to some or all of a client application (17) for the purposes of hosting it, based:
firstly on evaluations, distributed among at least 3 orchestrators (41 to 46) of said infrastructures (51 to 56), of their ability to satisfy the requirements of said client application (17),
then, a consensus protocol between said at least 3 orchestrators (41 to 46), which:
is based on said evaluations,
is carried out at a cooperation interface (3) interconnecting said at least 3 orchestrators (41 to 46) of a same swarm associated with said group of infrastructures (51 to 56),
chooses one of said infrastructures (51 at 56) of said group to host some or all of said client application (17), allocating some or all of the resources of the chosen infrastructure (51 to 56) to it,
wherein said deciding on the allocation of the computing resources comprises the following successive steps:
a first step of requesting the deployment of some or all of a client application (17) to one of the orchestrators (41 to 46) of the swarm,
a second step of broadcasting the requirements of some or all of said client application (17) to all orchestrators (41 to 46) of the swarm, over their cooperation interface (3),
a third step of notifying, over their cooperation interface (3), whether or not the orchestrators (41 to 46) of the swarm are participating in the evaluations,
a fourth step in which each of the orchestrators (41 to 46) participating in the evaluations performs the evaluation by calculating a score for some or all of said client application (17),
a fifth step of agreeing, via the consensus protocol, on the choice of which infrastructure(s) (51 to 56) of the group achieved the highest score for hosting some or all of said client application (17),
a sixth step of deploying some or all of said application (17) to the chosen infrastructure (51 to 56).

* * * * *